US012356281B2

(12) United States Patent
Balasubramanian et al.

(10) Patent No.: US 12,356,281 B2
(45) Date of Patent: Jul. 8, 2025

(54) JOINT UU AND SIDELINK POSITIONING FOR USER EQUIPMENTS IN UU INACTIVE/IDLE STATE

(71) Applicant: QUALCOMM Incorporated, San Diego, CA (US)

(72) Inventors: Anantharaman Balasubramanian, San Diego, CA (US); Shuanshuan Wu, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/932,886

(22) Filed: Sep. 16, 2022

(65) Prior Publication Data

US 2024/0107263 A1    Mar. 28, 2024

(51) Int. Cl.
*H04W 4/02*    (2018.01)
*H04W 4/029*    (2018.01)
*H04W 76/27*    (2018.01)

(52) U.S. Cl.
CPC ........... *H04W 4/023* (2013.01); *H04W 4/029* (2018.02); *H04W 76/27* (2018.02)

(58) Field of Classification Search
CPC ................................ H04W 4/02; H04W 76/27
See application file for complete search history.

(56) References Cited

U.S. PATENT DOCUMENTS

2014/0024378 A1    1/2014   Khude et al.
2019/0313423 A1    10/2019   Gupta et al.
(Continued)

FOREIGN PATENT DOCUMENTS

WO    2021222624 A1    11/2021
WO    2022047741 A1    3/2022

OTHER PUBLICATIONS

3GPP TS 38.300: "3rd Generation Partnership Project, Technical Specification Group Radio Access Network, NR, NR and NG-RAN Overall Description, Stage 2 (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.1.0, Jul. 19, 2022, pp. 1-209, XP052183752, chapters 3.2, 5.22.6, 5.3.6, 5.7, 6.12, 8.4, 16.9, 16.12.

(Continued)

*Primary Examiner* — Michael T Vu
(74) *Attorney, Agent, or Firm* — Thien T. Nguyen

(57) ABSTRACT

In some implementations, a network node of a wireless network may determine that a Radio Resource Control (RRC) connection state of a Uu interface of the target UE comprises an inactive or idle state. The network node may determine a time during which the target UE will be in a sidelink (SL) active state, wherein the SL active state comprises a state of operation in which the target UE monitors communication via one or more SL interfaces, transmits communication via the one or more SL interfaces, or both. The network node may send a message, the message for obtaining positioning measurements of the target UE using one or more SL devices corresponding to the one or more SL interfaces, wherein obtaining the positioning measurements is performed while (i) the RRC connection state comprises the inactive or idle state, and (ii) the target UE is in the SL active state.

19 Claims, 13 Drawing Sheets

(56) References Cited

U.S. PATENT DOCUMENTS

| | | | |
|---|---|---|---|
| 2020/0007247 A1 | 1/2020 | Gulati et al. | |
| 2022/0060450 A1 | 2/2022 | Slovetskiy | |
| 2022/0232474 A1 | 7/2022 | Xu et al. | |
| 2022/0236365 A1* | 7/2022 | Ko | G01S 5/0236 |
| 2022/0295514 A1* | 9/2022 | Shin | H04W 52/0216 |
| 2022/0386093 A1 | 12/2022 | Baek et al. | |
| 2023/0179281 A1 | 6/2023 | Svedman et al. | |
| 2023/0180343 A1* | 6/2023 | Park | H04W 76/28 |
| 2024/0080797 A1 | 3/2024 | Li et al. | |
| 2024/0097837 A1 | 3/2024 | Balasubramanian et al. | |

OTHER PUBLICATIONS

3GPP TS 38.305: "3rd Generation Partnership Project; Technical Specification Group Radio Access Network; NG Radio Access Network (NG-RAN); Stage 2 functional Specification of User Equipment (UE) Positioning in NG-RAN (Release 17)", Jul. 14, 2022, 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.1.0, Jul. 18, 2022, pp. 1-133, XP052183737, XP052211846, Sec. 4, 5.3, 7.4, 7.5, 7.6, 8.10.3.2.3.

International Search Report and Written Opinion—PCT/US2023/070872—ISA/EPO—Nov. 14, 2023.

Qualcomm Incorporated: "Potential Solutions for Sidelink Positioning", 3GPP TSG RAN WG1 #109-e, R1-2205038, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052191702, 11 pages, chapters 2-9.

* cited by examiner

JOINT UU AND SIDELINK POSITIONING FOR USER EQUIPMENTS IN UU INACTIVE/IDLE STATE

BACKGROUND

1. Field of Disclosure

The present disclosure relates generally to the field of wireless communications and, more specifically, to determining the location of a User Equipment (UE) using radio frequency (RF) signals.

2. Description of Related Art

In a data communication network, various positioning techniques can be used to determine the position of a mobile device (referred to herein as a UE). Some of these positioning techniques may involve determining distance and/or angular information of RF signals received by one or more other UEs communicatively coupled with the data communication network. In a fifth-generation (5G) wireless standard, referred to as New Radio (NR), direct communication between UEs (including the transmission of RF signals for positioning) may be referred to as sidelink (SL). A positioning session between UEs may be conducted to perform positioning measurements using SL RF signals, and UEs can coordinate such SL positioning sessions to ensure efficient use of bandwidth and other wireless resources.

BRIEF SUMMARY

An example method for performing positioning of a target user equipment (UE), according to this disclosure, may comprise determining, at a network node of a wireless network, that a Radio Resource Control (RRC) connection state of a Uu interface of the target UE comprises an inactive or idle state. The method also may comprise determining, at the network node, a time during which the target UE will be in a sidelink (SL) active state, wherein the SL active state comprises a state of operation in which the target UE monitors communication via one or more SL interfaces, transmits communication via the one or more SL interfaces, or both. The method also may comprise sending a message from the network node, the message for obtaining positioning measurements of the target UE using one or more SL devices corresponding to the one or more SL interfaces, wherein obtaining the positioning measurements is performed while (i) the RRC connection state comprises the inactive or idle state, and (ii) the target UE is in the SL active state.

An example method for performing positioning of a target user equipment (UE), according to this disclosure, may comprise determining, with the target UE, that a Radio Resource Control (RRC) connection state of a Uu interface of the target UE comprises or will comprise an inactive or idle state. The method also may comprise sending a message to a network node of a wireless network, the message indicative of time during which the target UE will be in a sidelink (SL) active state, wherein the SL active state comprises a state of operation in which the target UE monitors communication via one or more SL interfaces, transmits communication via the one or more SL interfaces, or both. The method also may comprise performing one or more ranging operations with one or more SL devices corresponding to the one or more SL interfaces, wherein the one or more ranging operations are performed while (i) the RRC connection state comprises the inactive or idle state, and (ii) the target UE is in the SL active state.

An example network node for performing positioning of a target user equipment (UE), according to this disclosure, may comprise a transceiver, a memory, one or more processors communicatively coupled with the transceiver and the memory, wherein the one or more processors are configured to determine that a Radio Resource Control (RRC) connection state of a Uu interface of the target UE comprises an inactive or idle state. The one or more processors further may be configured to determine a time during which the target UE will be in a sidelink (SL) active state, wherein the SL active state comprises a state of operation in which the target UE monitors communication via one or more SL interfaces, transmits communication via the one or more SL interfaces, or both. The one or more processors further may be configured to send a message via the transceiver, the message for obtaining positioning measurements of the target UE using one or more SL devices corresponding to the one or more SL interfaces, wherein obtaining the positioning measurements is performed while (i) the RRC connection state comprises the inactive or idle state, and (ii) the target UE is in the SL active state.

An example target UE for performing positioning of a target user equipment (UE), according to this disclosure, may comprise a transceiver, a memory, one or more processors communicatively coupled with the transceiver and the memory, wherein the one or more processors are configured to determine that a Radio Resource Control (RRC) connection state of a Uu interface of the target UE comprises or will comprise an inactive or idle state. The one or more processors further may be configured to send a message via the transceiver to a network node of a wireless network, the message indicative of time during which the target UE will be in a sidelink (SL) active state, wherein the SL active state comprises a state of operation in which the target UE monitors communication via one or more SL interfaces, transmits communication via the one or more SL interfaces, or both. The one or more processors further may be configured to perform one or more ranging operations with one or more SL devices corresponding to the one or more SL interfaces, wherein the one or more ranging operations are performed while (i) the RRC connection state comprises the inactive or idle state, and (ii) the target UE is in the SL active state.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
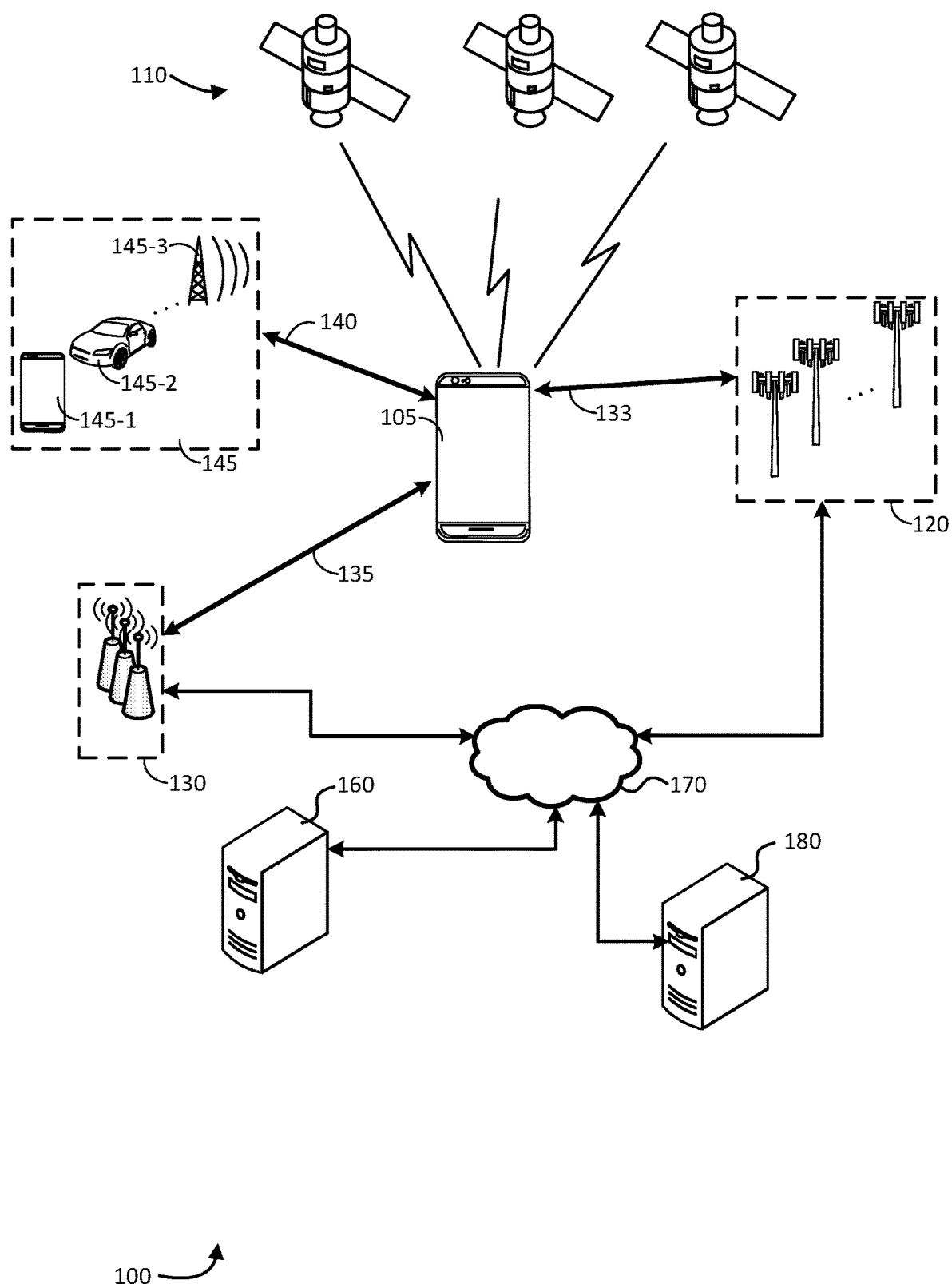
FIG. 1 is a simplified illustration of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc., or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

Position determination of a UE may be based at least in part on measurements of signals transmitted and/or received by the UE via sidelink (SL). In some instances, it may be desirable to determine the position and/or perform these signal measurements by UEs that are not in an active (or "connected") state with respect to a Uu interface with a network. However, transitioning to active/connected state for such positioning can be costly in terms of overhead and power. Embodiments herein leverage and SL interface of the UE to enable positioning of UE while a Uu interface of the UE is in an inactive or idle state. This can avoid the aforementioned overhead and power costs while also enabling positioning of the UE. Additional details regarding such embodiments are provided after a discussion of relevant technology.

FIG. 1 is a simplified illustration of a positioning system 100 in which a mobile device 105, location server 160, and/or other components of the positioning system 100 can use the techniques provided herein for positioning of the mobile device 105, according to an embodiment. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed hereafter.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. In a wireless cellular network (e.g., LTE or 5G), the mobile device 105 may be referred to as a user equipment (UE)

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the mobile device 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computer system configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When one or more other mobile devices 145 are used in the position determination of a particular mobile device 105, the mobile device 105 for which the position is to be determined may be referred to as the "target mobile device," and each of the other mobile devices 145 used may be referred to as an "anchor mobile device." (In a cellular/mobile broadband network, the terms "anchor UE" and "target UE" may be used.) For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., mobile device 105) may be facilitated using measurements from one or more anchor devices (e.g., mobile devices 145).

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another mobile device) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium, or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
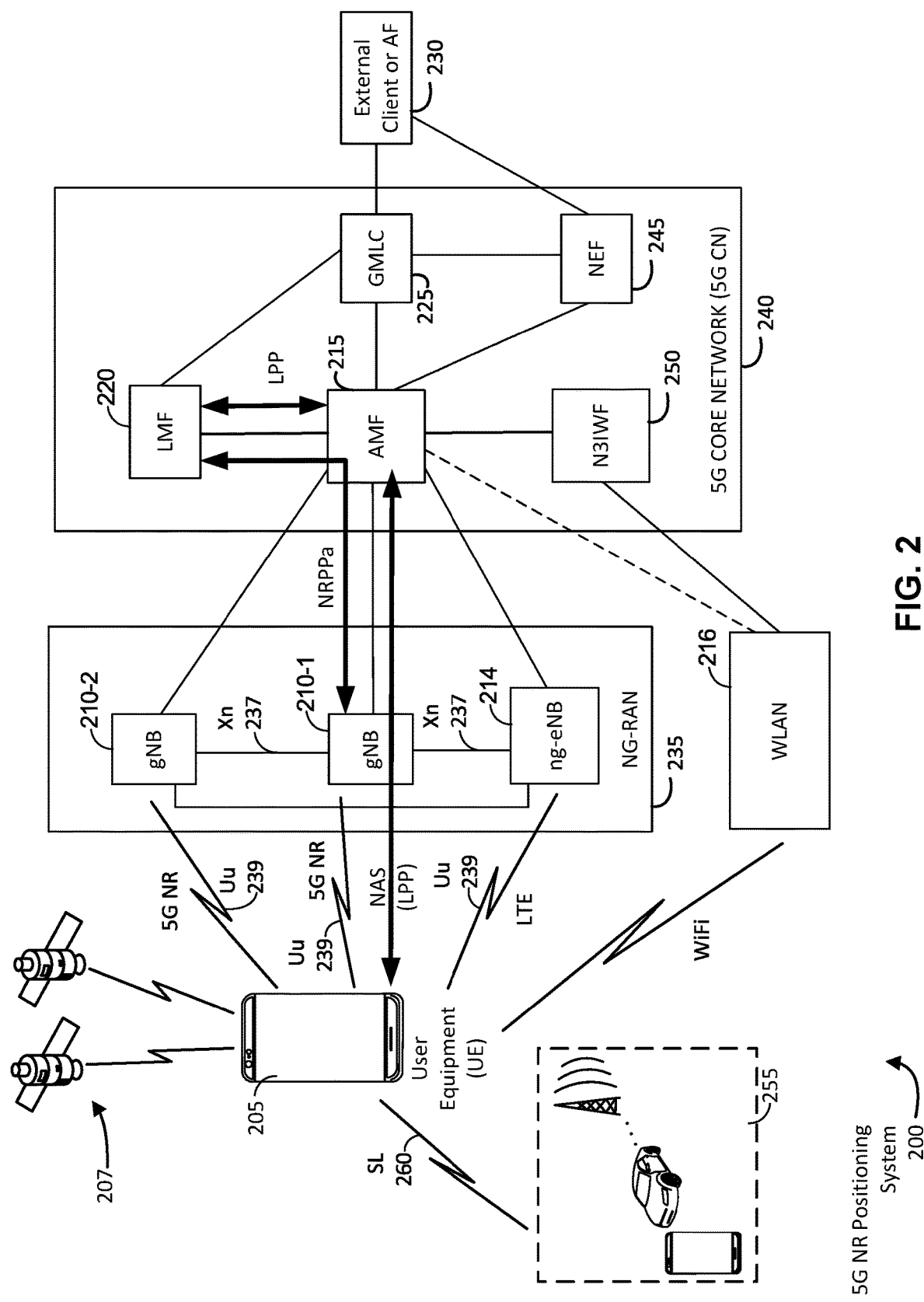
FIG. 2 is a diagram of a 5G NR positioning system, according to an embodiment.

FIG. 2 is a diagram of a 5G NR positioning system 200, illustrating an embodiment of a positioning system (which may correspond to at least a portion of a larger positioning system as described herein, such as the positioning system 100 of FIG. 1) implementing 5G NR. The 5G NR positioning system 200 may be configured to determine the location of a user equipment (UE) 205 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations described elsewhere herein, and the WLAN 216 may correspond with one or more access points described elsewhere herein. Optionally, the 5G NR positioning system 200 additionally may be configured to determine the location of a UE 205 by using an LMF 220 (which may correspond with a location server as described elsewhere herein) to implement the one or more positioning methods. Here, the 5G NR positioning system 200 comprises a UE 205, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 207. As previously indicated, satellites 207 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 207 may comprise NTN satellites that may be communicatively coupled with the LMF 220 and may operatively function as a TRP (or TP) in the NG-RAN 235. As such, satellites 207 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 207, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), navigation device, Internet of Things (IoT) device, or some other portable or moveable device. Typically, though not necessarily, the UE 205 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like one or more RATs as described elsewhere herein) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to an external client as implemented in or communicatively coupled with a 5G NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations as described elsewhere herein and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 205 via wireless communication between the UE 205 and one or more of the gNBs 210, which may provide wireless communications access to the 5G CN 240 on behalf of the UE 205 using 5G NR. The wireless interface between base stations (gNBs 210 and/or ng-eNB 214) and the UE 205 may be referred to as a Uu interface 239. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 205. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., access points, as described elsewhere herein). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 205 and/or obtain downlink (DL) location measurements from the UE 205 that were obtained by UE 205 for DL signals received by UE 205 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node (e.g., gNB 210, ng-eNB 214, or WLAN 216) of a first RAT to an access node of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 205 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 205 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AoD, and/or ECID. The NRPPa protocol may be used to support positioning of UE 205 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220, described in more detail hereafter.

Positioning of the UE 205 in a 5G NR positioning system 200 further may utilize measurements between the UE 205 and one or more other UEs 255 via a sidelink connection SL 260. As shown in FIG. 2, the one or more other UEs 255 may comprise any of a variety of different device types, including mobile phone, vehicle, roadside units (RSU), other device types, or any combination thereof. One or more position measurement signals sent via SL 260 to the UE 205 from the one or more other UEs 255, to the one or more other UEs 255 from the UE 205, or both. Various signals may be used for position measurement, including sidelink PRS (SL-PRS). In some instances, the position of at least one of the one or more of the other UEs 255 may be determined at the same time (e.g., in the same positioning session) as the position of the UE 205. In some embodiments, the LMF 220 may coordinate the transmission of positioning signals via SL 260 between the UE 205 and the one or more other UEs 255. Additionally or alternatively, the UE 205 and the one or more other UEs 255 may coordinate a positioning session between themselves, without an LMF 220 or even a Uu connection 239 to an access node of the NG-RAN 235. To do so, the UE 205 and the one or more other UEs 255 may communicate messages via the SL 260 using sidelink positioning protocol (SLPP). In some scenarios, the one or more other UEs 255 may have a Uu connection 239 with an access node of the NG-RAN 235 and/or Wi-Fi connection with WLAN 216 when the UE 205 does not. In such instances, the one or more other UEs 255 may operate as relay devices, relaying communications to the network (e.g., LMF 220)

from the UE 205. In such instances, a plurality of other UEs 255 may form a chain between the UE 205 and the access node.

In a 5G NR positioning system 200, positioning methods can be categorized as being "UE assisted" or "UE based." This may depend on where the request for determining the position of the UE 205 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 205 may obtain location measurements and send the measurements to a location server (e.g., LMF 220) for computation of a location estimate for UE 205. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 205 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 207), WLAN, etc.

With a UE-based position method, UE 205 may obtain location measurements (e.g., which may be the same as or similar to location measurements for a UE assisted position method) and may further compute a location of UE 205 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 205, and/or may receive measurements obtained by UE 205 or by an AP in WLAN 216 in the case of N3IWF 250, and may send the measurements to a location server (e.g., LMF 220) for computation of a location estimate for UE 205.

Positioning of the UE 205 also may be categorized as UL, DL, or DL-UL based, depending on the types of signals used for positioning. If, for example, positioning is based solely on signals received at the UE 205 (e.g., from a base station or other UE), the positioning may be categorized as DL based. On the other hand, if positioning is based solely on signals transmitted by the UE 205 (which may be received by a base station or other UE, for example), the positioning may be categorized as UL based. Positioning that is DL-UL based includes positioning, such as RTT-based positioning, that is based on signals that are both transmitted and received by the UE 205. Sidelink (SL)-assisted positioning comprises signals communicated between the UE 205 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3A:
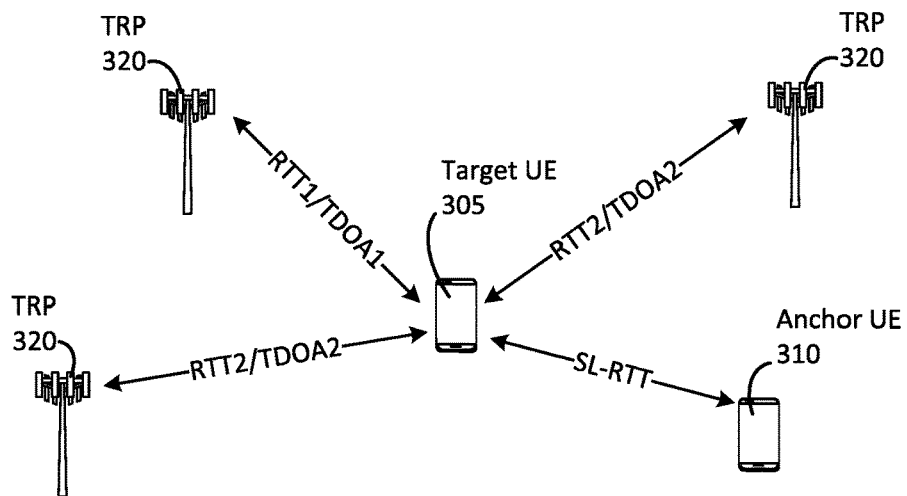
FIGS. 3A-3C are simplified diagrams of scenarios in which sidelink positioning may be used to determine the position of a target UE, according to an embodiment.
Figure 3B:
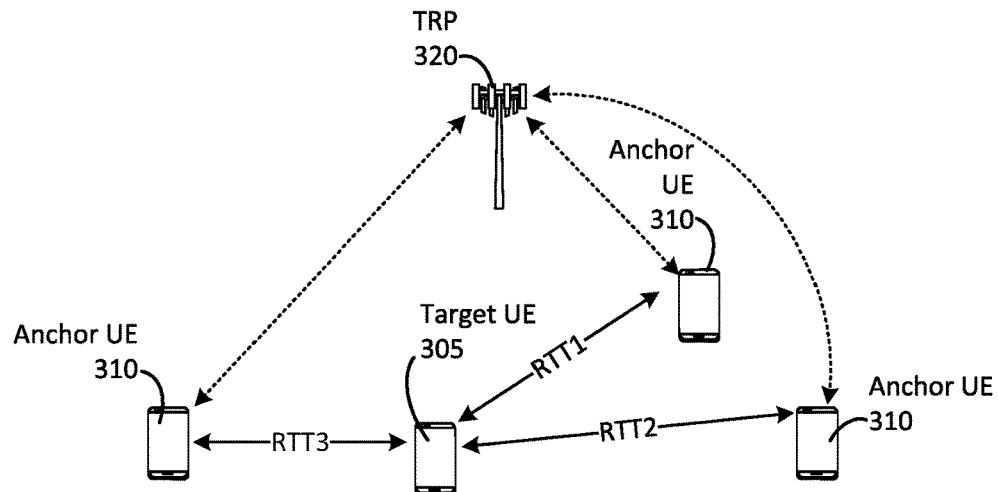
Figure 3C:
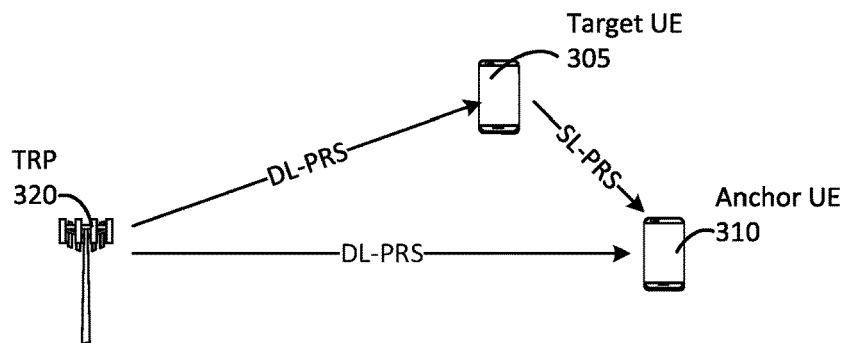

FIGS. 3A-3C are simplified diagrams of scenarios in which sidelink positioning may be used to determine the position of a target UE 305, according to some embodiments. One or more anchor UEs 310 may be used to send and/or receive reference signals via sidelink. As illustrated, positioning may be further determined using one or more base stations 320 (a Uu interface). It will be understood, however, that the signals used for positioning of the UE 305 may vary, depending on desired functionality. More particularly, some types of positioning may utilize signals other than RTT/TDOA as illustrated in FIGS. 3A-3C.

The diagram of FIG. 3A illustrates a configuration in which the positioning of a target UE 305 may comprise RTT and/or TDOA measurements between the target UE 305 and three base stations 320. In this configuration, the target UE 305 may be in coverage range for DL and/or UL signals via Uu connections with the base stations 320. Additionally, the anchor UE 310 at a known location may be used to improve the position determination for the target UE 305 by providing an additional anchor. As illustrated, ranging may be performed between the target UE 305 and anchor UE 310 by taking RTT measurements via the sidelink connection between the target UE 305 and anchor UE 310.

The diagram of FIG. 3B illustrates a configuration in which the positioning of a target UE 305 may sidelink only (SL-only) positioning/ranging. In this configuration, the target UE 305 may perform RTT measurements via sidelink connections between a plurality of anchor UEs 310. In this example, the target UE 305 may not be in UL coverage of the base station 320, and therefore each anchor UE 310 may report RTT measurement information to the network via a Uu connection between each anchor UE 310 and the base station 320. (In cases in which a UE relays information between a remote UE and a base station, a UE may be referred to as a "relay" UE.) Such scenarios may exist when the target UE 305 has weaker transmission power than anchor UEs 310 (e.g., the target UE 305 comprises a wearable device, and anchor UEs comprise larger cellular phones, IOT devices, etc.). In other scenarios in which the target UE 305 is within UL coverage of the base station 320, the target UE 305 may report RTT measurements directly to the base station 320. In some embodiments, no base station 320 may be used, in which case one of the UEs (e.g., the target UE 305 or one of the anchor UEs 310) may receive RTT measurement information and determine the position of the target UE 305.

The diagram of FIG. 3C illustrates a configuration in which the positioning of a target UE 305 may comprise the target UE 305 and anchor UE 310 receiving a reference signal (DL-PRS) from the base station 320, and the target UE 305 sending a reference signal (SL-PRS) to the anchor UE 310. The positioning of the target UE can be determined based on known positions of the base station 320 and anchor UE 310 and a time difference between a time at which the anchor UE 310 receiving the reference signal from the base station 320 and a time at which the anchor UE 310 receives the reference signal from the target UE 305.

As previously discussed, the use of sidelink positioning (e.g., SL-only or Uu/SL positioning, as illustrated in FIGS. 3A-3C) may utilize a Resource Pool for Positioning (RP-P). RP-P may be conveyed to UEs via a sidelink configuration (e.g., using techniques described hereafter), and may designate particular resource pools for sidelink reference signals in different scenarios. Resource pools comprise a set of resources (e.g., frequency and time resources in in an orthogonal frequency-division multiplexing (OFDM) scheme used by 4G and 5G cellular technologies) that may be used for the transmission of RF signals via sidelink for positioning. Each resource pool may further include a particular subcarrier spacing (SCS), cyclic prefix (CP) type, bandwidth (BW) (e.g., subcarriers, bandwidth part, etc.), time-domain location (e.g., periodicity and slot offset) Resource pools may comprise, for example, Tx resource pools for "Mode 1" sidelink positioning in which sidelink positioning is performed using one or more network-connected UEs, in which case network-based resource allocation may be received by a network-connected UE via a Uu interface with a base station (e.g., via Downlink Control Information (DCI) or Radio Resource Control (RRC)). Tx resource pools for "Mode 2" sidelink positioning in which autonomous resource selection is performed by UEs without network-based resource allocation. Resource pools may further comprise Rx resource pools, which may be used in either Mode 1 or Mode 2 sidelink positioning. Each RP-P configuration may be relayed via a physical sidelink control channel (PSCCH), which may reserve one or more SL-PRS configurations. Each of the one or more SL-PRS configurations in RP-P may include respective specific physical layer features such as a number of symbols, comb type, comb-offset, number of subchannels, some channel size, and start resource block (RB). The RP-P configuration may further include a sensing configuration, power control, and/or Channel Busy Ratio (CBR).

Positioning of a target UE can be impacted based on an RRC connection state of the target UE. For example, full positioning capabilities may be available in an RRC_CONNECTED state (also referred to herein as an "active" or "connected" state). On the other hand, when the target UE is in an RRC_INACTIVE state or an RRC_IDLE state (also referred to herein as "inactive" and "idle" states, respectively), positioning still may be performed, but certain limitations may apply. For example, the Small Data Transmission (SDT) feature allows data and/or signaling transmission while the UE remains is in an inactive state (e.g., without transitioning to a connected state). A positioning procedure utilizing SDT may be initiated by a target UE with either a transmission over a random access channel (RACH) (referred to in SDT as RA-SDT) or over Type 1 configured grant (CG) resources (referred to in SDT as CG-SDT). When using SDT for positioning, an uplink location service (LCS) or LPP message can be transported while the UE is in an inactive mode. If the UE initiated data transmission using UL SDT, the network can send DL LCS, LPP, and RRC messages to the UE.

Currently, a target UE may need to be in an active/connected mode in order for positioning of the target UE to be performed using SL and Uu interfaces. Consider FIG. 4, for example.

Figure 4:
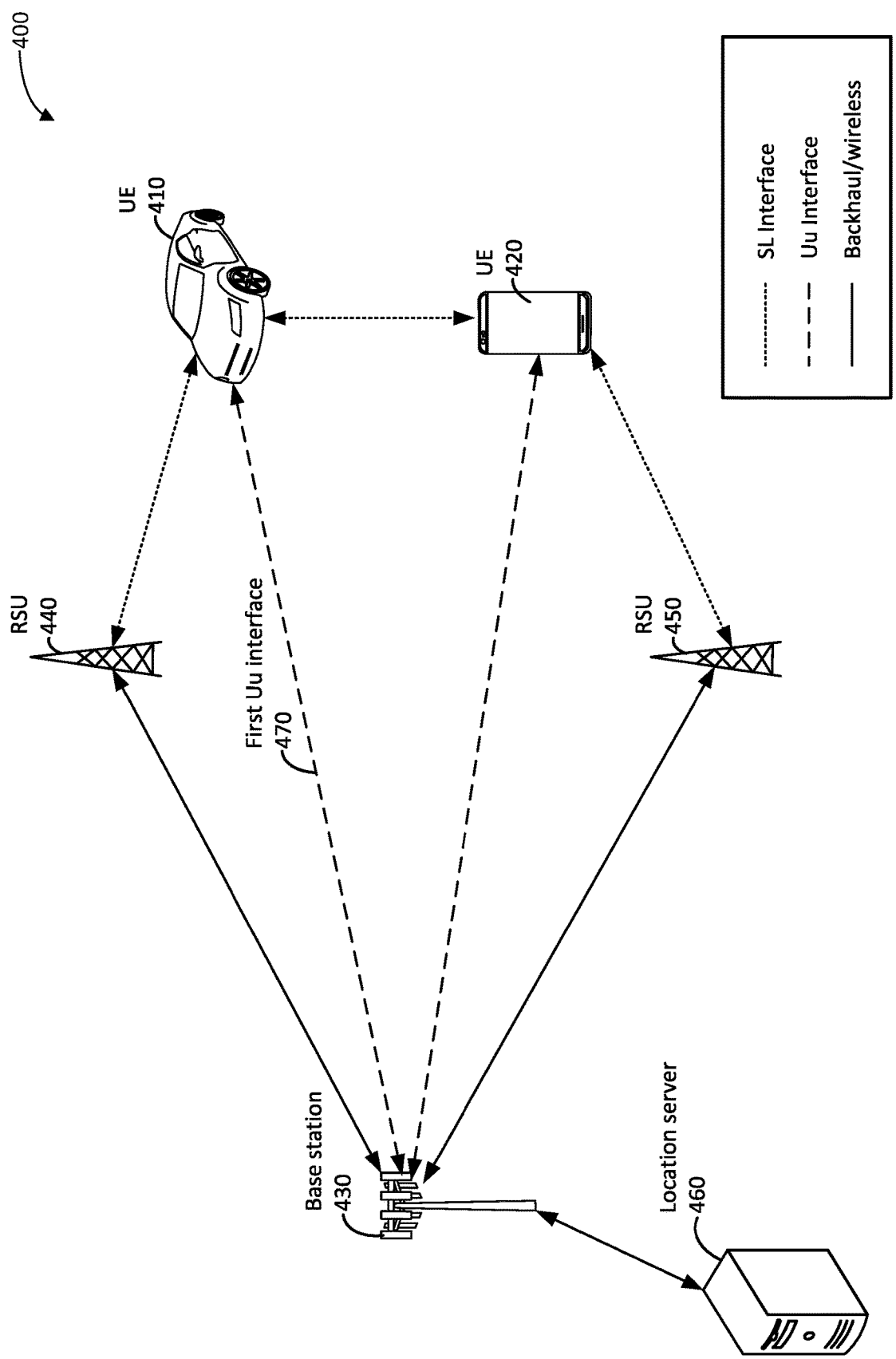
FIG. 4 is a simplified diagram of an example scenario in which positioning may take place, according to an embodiment.

FIG. 4 is a simplified diagram of an example scenario 400 in which two UEs, first UE 410 and second UE 420 are communicatively connected with a base station 430 via Uu interfaces, and are further connected with first RSU 440 and second RSU 450—and with each other—via SL interfaces. The base station 430 is further communicatively coupled with the location server 460. As described with respect to FIG. 2, the location server 460 may comprise an LMF (e.g., LMF 220), and base station 430 may comprise a gNB (e.g., gNBs 210). Further, UEs 410 and 420 may comprise any of a variety of devices. In the example of FIG. 4, the first UE 410 comprises a vehicle, and the second 420 comprises a mobile device.

In this scenario 400, if the first UE 410 may transition its respective Uu interface, first Uu interface 470, with the base station 430 from a connected state to an inactive or idle state. If the network (e.g., the location server 460) then wants to perform positioning for the first UE 410, it may do so via the first Uu interface 470 and/or SL interfaces. However, traditionally, to perform positioning of the first UE 410 using the first Uu interface 470 with the base station 430, the network would transition the first UE 410 to a connected state, then perform conventional Uu positioning. However, this would incur Uu overhead because of the following two operations would need to be performed with regard to the Uu interface: (i) the first UE 410 would need to transition to a connected state, and (ii) the first UE 410 would need to transition back to the inactive or idle state once Uu position measurements have been performed.

Embodiments herein are directed toward addressing these and other issues by leveraging one or more SL interfaces for positioning of a target UE while the target UE is in an inactive or idle state with respect to a Uu interface. To do so, embodiments may leverage the fact that Uu and SL interfaces can operate independently; when a Uu interface transitions to inactive or idle, an SL interface can still be used to perform positioning/ranging. According to some embodiments, a UE may notify a network node (e.g., base station or location server) a UE may inform the network that it may be in SL active state, if it transitions to an inactive or idle state in Uu. This can alert the network of the UE's availability for positioning through the SL interface. According to some embodiments, the UE may provide identification information for specific devices through which the UE may be reached via an SL interface. In the scenario 400 of FIG. 4, for example, the first UE 410 may notify the location server 460 that an SL interface with the first RSU 440 is active, providing the location server 460 with an ID of the first RSU 440.

As used herein, an SL active state may refer to a state in which a UE monitors SL transmission via one or more SL interfaces. This includes monitoring of reference signals that could be used for positioning of the UE, such as SL-PRS, an SL primary synchronization symbol (SL PSS), a sidelink secondary synchronizations symbol (SL SSS), or any combination thereof. In an SL active state, a UE may have an SL interface with one or more other devices. In the scenario 400 of FIG. 4, for example, the first UE 410 may be considered in an SL active state when monitoring and/or transmitting via an SL interface with the second UE 420, first RSU 440, second RSU 450, or any combination thereof.

According to some embodiments, once the network is made aware of this information, it can reach a target UE for positioning in different ways. According to a first solution, for example, the network (e.g., a base station or location server) may perform positioning of a target UE via in RSU (or other device connected to the network via a non-Uu interface) that has SL connectivity with the target UE. According to a second solution, the network (e.g., a base station) may perform positioning of the target UE via an anchor UE, where the anchor UE is in a connected state with respect to a Uu interface with a network and further has SL connectivity with the target UE. These solutions can enable a network to have flexibility in selecting UEs and/or RSUs with which communications with the target UE can be performed during the positioning of the target UE.

Choosing one solution over another (e.g., choosing working through and RSU over a UE) can help increase the accuracy of a determined position for a target UE and may be determined based on one or more factors. One factor may be, for example, line of sight (LoS) probability between a device (e.g., RSU or UE) and a target UE. If one device has a relatively high LoS probability and another device has a relatively low probability, the device with the relatively high LoS probability may be selected, because ensuring LoS can help ensure a more accurate position determination of a target UE. Another factor may be the difference between a known location of the anchor UE or RSU and an approximate location of a target UE. For example, the device (anchor UE or RSU) that is closer may be selected because the closer device may result in a more accurate position determination for the target UE. Another factor may comprise an accuracy of a location of the anchor UE or RSU. The more accurate the location (e.g., within 10 m, 5 m, 1 m, 50 cm, etc.), the more accurate the estimated position for the target UE can be. Another factor may comprise a mobility of the target UE and/or anchor UE. If a target and anchor UE are moving in the same or similar direction, the anchor UE may be selected over an RSU because it may be more likely that the anchor UE will be in wireless range of the target UE for the entirety of a positioning session. On the other hand if anchor and target UEs are moving in opposite directions, an RSU may be selected. Factors may comprise quality of service (QoS) of a connection between the target UE and the anchor UE or RSU, as well as the connection between the anchor UE or RSU and the network. For example, it may be desirable to utilize an RSU rather than an anchor UE if the anchor UE has a poor connection with the network and/or target UE.

Figure 5:
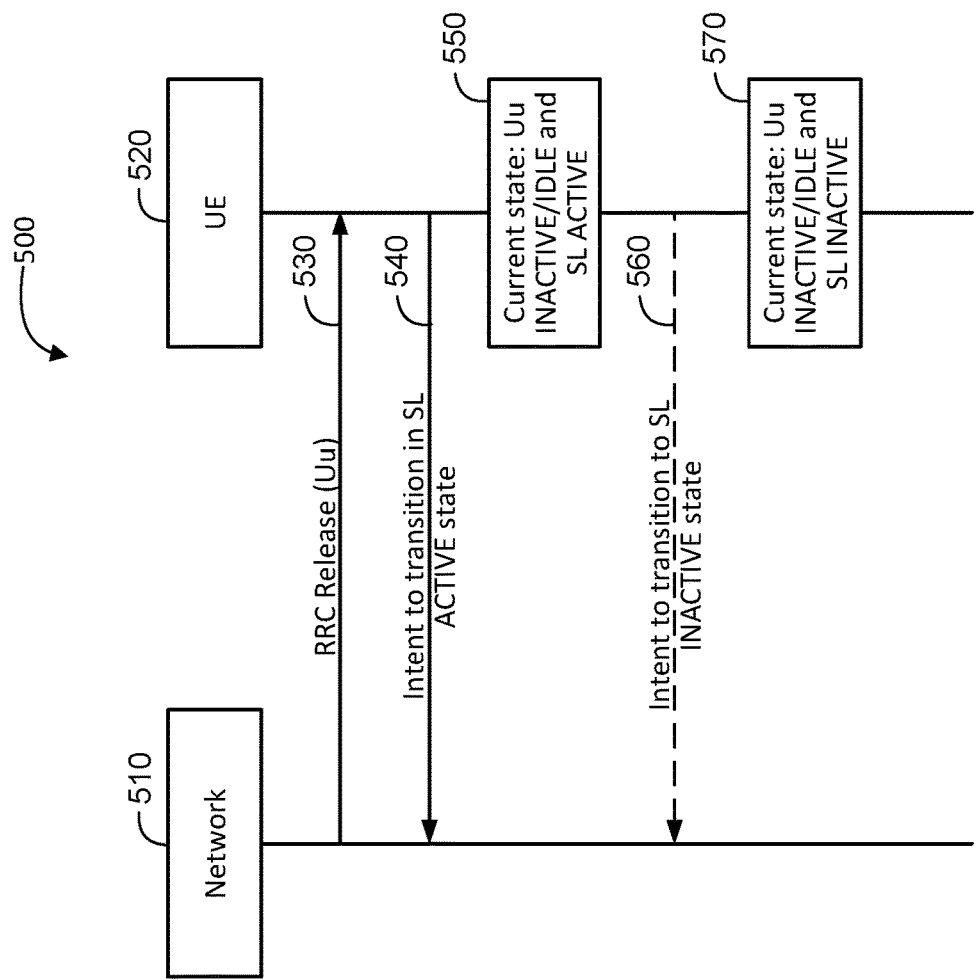
FIG. 5 is a signal flow diagram of a method of informing a network of the availability of using an SL interface for a positioning a UE when the UE is in an inactive or idle RRC state, according to an embodiment.

FIG. 5 is a signal flow diagram of a method 500 of informing a network 510 the availability of using an SL interface for positioning a UE 520 when the UE is in an inactive or idle RRC state, according to an embodiment. Arrows in FIG. 5 indicate communications/messages sent from one device to another, and each arrow may represent one or more messages. Here, the functionality of the network 510 may be performed by a network node, such as a base station or location server. In the case of a base station, communications between the UE and the base station may be made via RRC messaging, for example. In the case of a location server, communications between the UE 520 and the location server may be relayed by one or more intervening devices, including a serving base station (not shown), and may be made via LPP, for example.

The method 500 may begin with the operation 530, in which the network 510 releases the UE 520, causing the Uu interface to become inactive or idle. In response, the UE 520 can then perform operation 540, in which the UE informs the network of its intent to transition to (or stay in) an SL active state while the Uu interface remains active or idle. The message(s) sent at operation 540, also may indicate, for example, an identification of one or more devices with which the UE has an SL interface (or will have during the SL active state). As indicated in FIG. 5 at operation 550, UE 520 may then remain in the SL active state and Uu inactive or idle state for the duration of the time indicated to the network 510.

Optionally, the message(s) sent at operation 540 may also indicate a duration of time the UE will remain in the SL active state before transitioning to an SL inactive state (e.g., in which UE will no longer monitor or transmit via the SL interface(s)), or combination thereof. The duration of time the UE will remain in the SL active state may be conveyed via a timer (e.g., time duration T), a start/end time, or the like.

Optionally (e.g., if a duration of time the UE will remain in the SL active state is not provided at operation 540), the UE 520 may perform operation 560, in which the UE 520 then sends an indication to the network 510 of the UE's intent to transition to an SL inactive state. This can enable the network to perform positioning of the UE 520, if needed. As such, the timing of operation 560 may be sufficient to allow the network 510 to perform the positioning prior to the UE 520 entering the SL inactive state. According to some embodiments, the timing of operation 560 (and/or operation 540) may be established between the UE 520 and network 510 and/or defined in an applicable standard.

At operation 570, the UE then enters the SL inactive state while also remaining in the Uu inactive or idle state. Any further changes from the state may be conveyed to the network 510. While the UE 520 is in the Uu inactive or idle state and the SL inactive state, the network 510 still may be capable of performing positioning of the UE 520. To do so, however, it may need to change the state of the Uu connection between the UE 520 and the network 510 from inactive or idle to connected.

Figure 6:
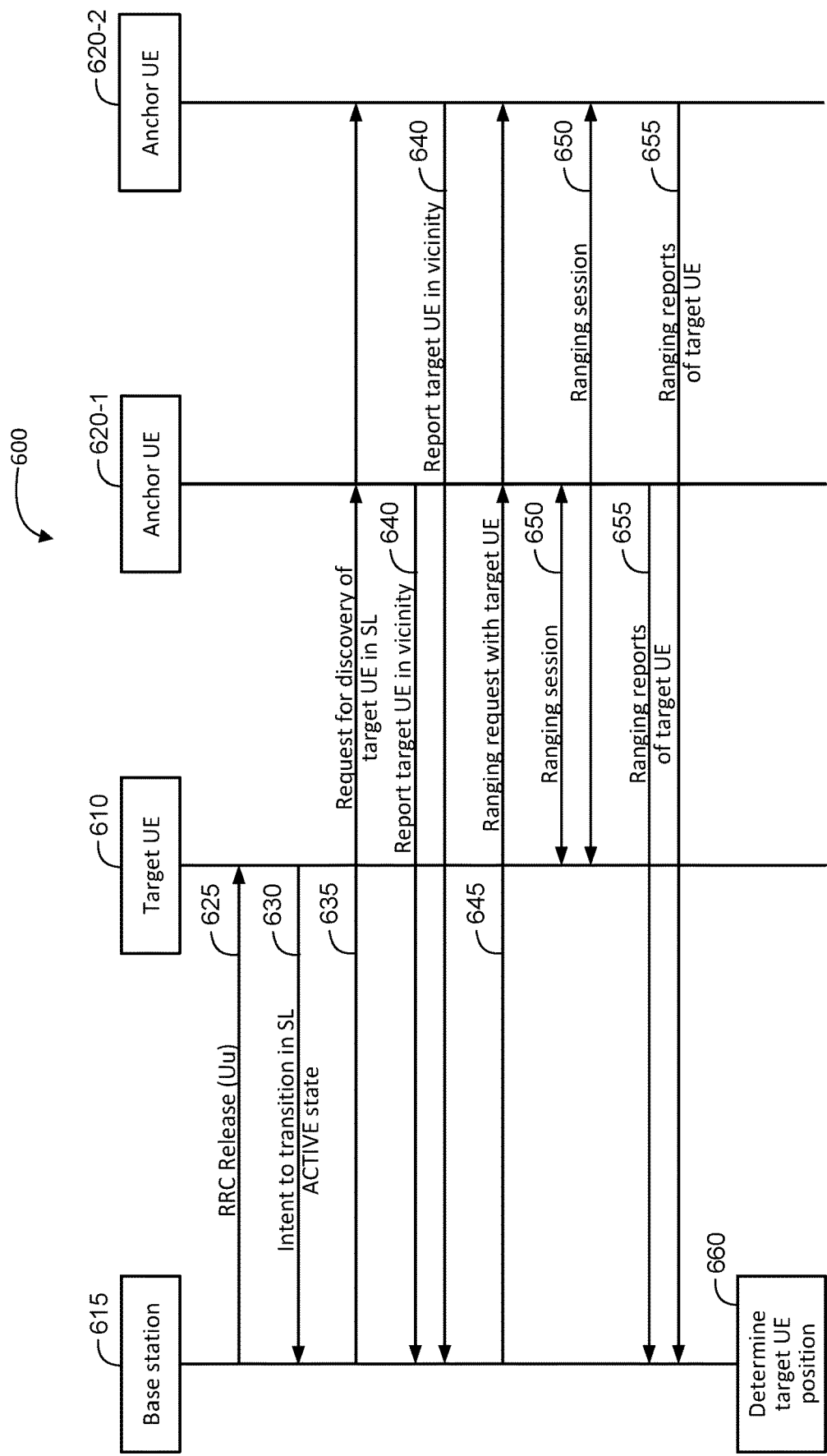
FIG. 6 is a signal flow diagram of an example method of positioning a target UE while the target UE is in an SL active mode and a Uu inactive or idle mode, according to an embodiment.

FIG. 6 is a signal flow diagram of an example method 600 of positioning a target UE 610 while the target UE 610 is in an SL active mode and a Uu inactive or idle mode, according to an embodiment. Here, a base station 615 (e.g., a gNB) uses SL interfaces of the target UE 610 with a first anchor UE 620-1 and a second anchor UE 620-2 to obtain positioning information to calculate the position of the target UE 610. Of course, different scenarios may have a different number of anchor UEs than illustrated in FIG. 6, including a single anchor UE or more than two anchor UEs. Alternative embodiments may utilize one or more RSUs in addition or as an alternative to the anchor UEs 620-1 and 620-2. For each of anchor UEs 620-1 and 620-2, the respective anchor UE may have a Uu connection with the base station 615, or may have a separate connection (e.g., via an SL connection with an RSU).

The method 600 may begin with operation 625 in which the base station 615 performs an RRC release, transitioning the Uu interface between the base station 615 and target UE 610 from a connected state to an idle or inactive state. As described with respect to FIG. 5, the target UE 610 can then respond by indicating to the base station 615 an intent to transition to an SL active state, at least for a certain period of time, as shown in operation 630. The operations 625 and 630 are meant to provide a simplified illustration of how the method 500 of FIG. 5 may be performed. In alternative embodiments of the method 600, additional or alternative operations may be performed, as described with respect to FIG. 5.

Operations 635 and 640 can enable the base station 615 to determine how to reach the target UE 610. In particular, at operation 635, the base station 615 sends a request to anchor UEs 620-1 and 620-2 to perform discovery to discover target UE 610 via SL. As previously noted, the target UE 610 may indicate to the base station 615 the IDs of one or more UEs with which it can maintain an active SL connection. As such, the request sent by the base station 615 at operation 635 may be based on the IDs provided to the base station 615 by the target UE 610 (e.g., at operation 630). At operations 640, each of the anchor UEs 620-1 and 620-2 report back to the base station 615 that the target UE 610 was detected during discovery. According to some embodiments, the base station 615 may be able to determine that the target UE 610 is in the vicinity of anchor UEs 620-1 and 620-2 (and available for SL ranging) using one or more techniques. According to a first technique, the base station 615 can request (e.g., at operation 635) that the anchor UEs 620-1 and 620-2 provide a subset of other connected UEs (in Uu) that anchor UEs 620-1 and 620-2 are able to detect during discovery, to determine whether the target UE 610 is in their range (in SL interface). The base station 615 can do this based on approximate locations of the target UE 610 and the anchor UEs 620-1 and 620-2. The request provided by the base station 615 may further include the SL ID of the target UE 610, which can enable the anchor UEs 620-1 and 620-2 to discover the target UE 610 in SL. According to some embodiments, the base station 615 may be aware of the SL & Uu ID mappings of each of the UEs, as they all May have both Uu & SL connections. In some instances, each UE can provide its SL ID to the base station 615 as well. According to another technique, the base station 615 may request a subset of connected UEs in Uu (e.g., anchor UEs 620-1 and 620-2) to prompt the anchor UEs 620-1 and 620-2 to report the SL IDs of connected UEs they sense.

Operation 645, 650, and 655 comprise ranging operations for the positioning of the target UE 610. That is, with the information that the target UE 610 is within the vicinity of anchor UEs 620-1 and 620-2, the base station 615 sends a ranging request to each of the anchor UEs 620-1 and 620-2 at operation 640, requesting ranging information regarding target UE 610. Each of the anchor UEs 620-1 and 620-2 then responds by performing a ranging session with the target UE 610, as indicated at operation 650. The anchor UEs 620-1 and 620-2 then report the ranging measurements obtained during the ranging session to the base station 615 at operation 655. With these measurements, the base station then determines the position of the target UE, as indicated at operation 660.

The ranging sessions performed at operation 650 may be done in different ways, depending on desired functionality. For example, according to a first option, the base station 615 may indicate to the anchor UEs 620-1 and 620-2 in the message at operation 645) that the anchor UEs 620-1 and 620-2 may jointly decide with the target UE 610 regarding how to conduct the ranging session at operation 650. This can include, for example, the reference signal (e.g., PRS) sequence and other sidelink measurement details for sidelink ranging. In this option, sidelink ranging procedures between the target UE 610 and each of the anchor UEs 620-1 and 620-2 may be agnostic to the base station 615. According to a second option, the base station 615 may explicitly provide the information regarding how to conduct the ranging sessions to the anchor UEs 620-1 and 620-2. In some instances, and depending on circumstances, embodiments may employ both options.

The ranging reports provided by the anchor UEs 620-1 and 620-2 at operations 655 may be provided in different ways, depending on desired functionality. According to some embodiments, for example, the base station 615 may provide a configured grant (CG) for anchor UEs 620-1 and 620-2 to report ranging measurements. Additionally or alternatively, anchor UEs 620-1 and 620-2 may report the ranging measurements as a part of channel quality information (CQI)/feedback measurement through PUCCH and/or PUSCH.

As previously noted, an RRC connection state of a Uu interface between a UE and a base station is generally unknown to a location server. Thus, according to some embodiments in which positioning is orchestrated using a location server, the RRC connection state of a Uu may be shared with a location server (e.g., by a base station). An example of this is shown in FIG. 7.

Figure 7A:
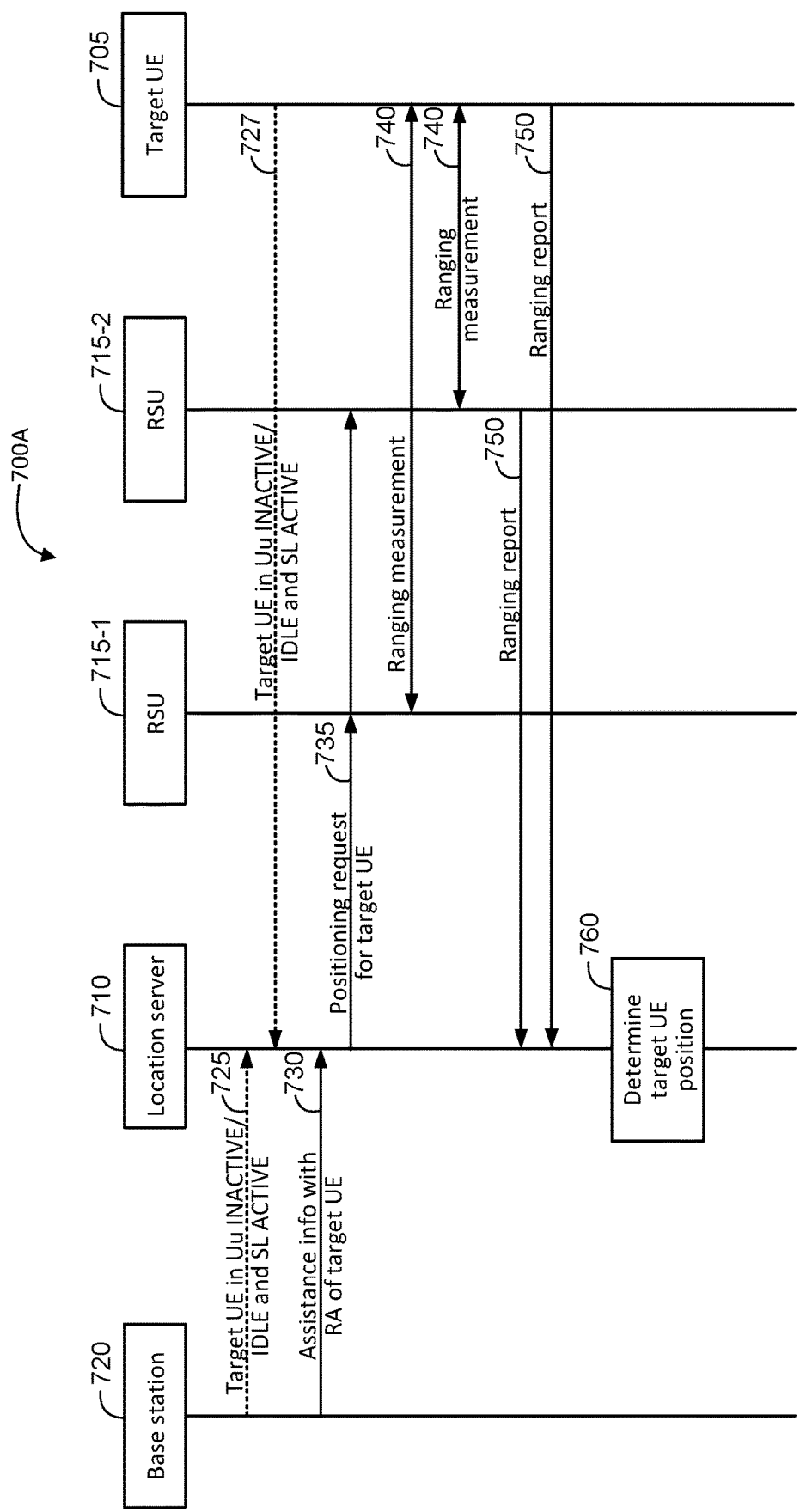
FIGS. 7A and 7B are signal flow diagrams of example methods of positioning a target UE using a location server while the target UE is in an SL active mode and a Uu inactive or idle mode, according to an embodiment.

FIG. 7A is a signal flow diagram of a first example method 700A of positioning a target UE 705 using a location server 710 (e.g., an LMF) while the target UE 705 is in an SL active mode and a Uu inactive or idle mode, according to an embodiment. Here, positioning is performed using a first RSU 715-1 and a second RSU 715-2. The positioning further involves a base station 720 (e.g., gNB). As with other figures herein, FIG. 7A is provided as a non-limiting example. Alternative embodiments may utilize additional or alternative devices, including any combination of anchor UEs and/or RSUs.

The method 700A may begin with optional operation 725, in which the base station 720 provides the location server 710 with an indication that the target UE 705 has or will be transitioning to an SL active state while in a Uu inactive or idle state. This can be done, for example, in response to a similar message received by the base station from the target UE (e.g., at operation 540 of FIG. 5 operation 630 FIG. 6). Messaging between the base station 720 and location server 710 may utilize one or more applicable protocols, such as NRPPa. Alternatively, as shown by optional operation 727, an equivalent message may be sent to the location server 710 by the target UE 705 (e.g., relayed by base station 720) via LPP messaging. If the target UE 705 already transitioned to an active mode, the target UE 705 may transmit the LPP messaging using UL SDT, for example.

To enable this information to be provided via LPP messaging, LPP may be adapted to convey this information. That is, a new information element (IE) or other data structure may be introduced into LPP that indicates an RRC connection state of a Uu interface between a UE and base station. Additionally or alternatively, this information may be included in an existing data structure (e.g., IE) currently used in LPP. Similar adaptations may be utilized in other protocols used, such as NRPPa.

At operation 730, the location server at 710 receives assistance information from the base station 720. This assistance information can include the current registration area (RA) of the target UE 705 and/or the IDs of the RSUs 715-1 and 715-2 that are able to communicate with the target UE 705 while the target UE remains in SL active mode. According to some embodiments, the assistance information transmitted at operation 730 may be in response to a request (not shown) for the assistance information sent to the base station 720 by the location server 710.

According to the method 700A, once the LMF is aware of the RRC connection state of the UE and the identity of the RSUs 715-1 and 715-2, it can work with the RSUs 715-1 and 715-2 to perform ranging of the target UE 705. (An alternative example in which the location server 710 works through the base station 720 to perform the ranging is provided below, with regard to FIG. 7B.) Thus, at operation 735, the location server 710 can send a request to the RSUs 715-1 and 715-2 for positioning of the target UE. As previously noted, the positioning request may include an SL ID of the target UE 705. The request can then prompt RSUs 715-1 and 715-2 to perform ranging and obtain ranging measurements at operations 740. Although not illustrated in FIG. 7A, the request sent from the location server 710 may be relayed via the base station 720 and/or other intervening devices. At operations 750, the RSUs 715-1 and 715-2 then report the ranging measurements back to the location server 710. With this information, and the known position of the RSUs 715-1 and 715-2, the location server 710 can then perform operation 760, in which the location server 710 determines the location of the target UE 705.

Figure 7B:
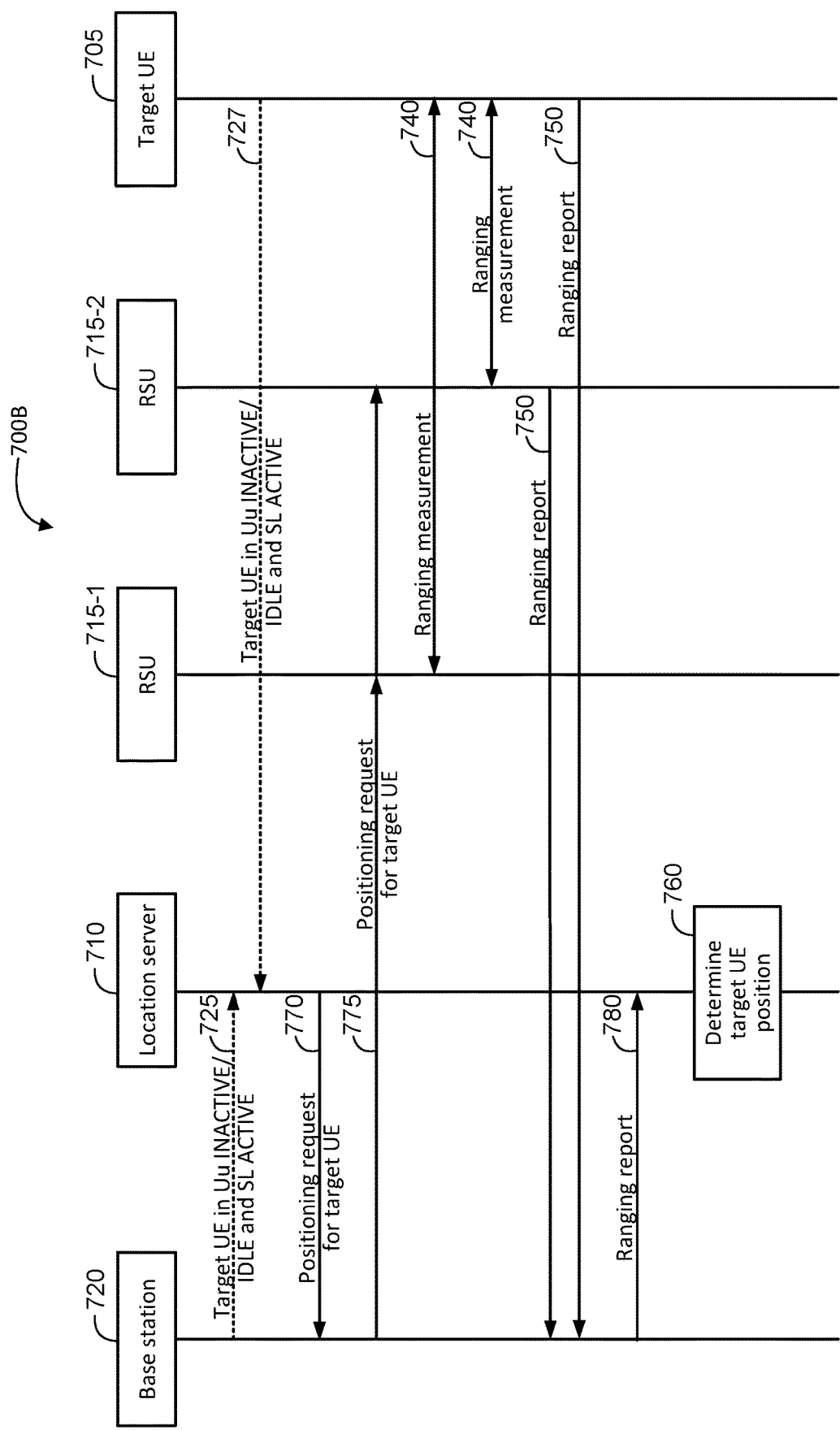

FIG. 7B is a signal flow diagram of a second example method 700B of positioning a target UE 705 using a location server 710 while the target UE 705 is in an SL active mode and a Uu inactive or idle mode, according to an embodiment. Method 700B is a variation to method 700A in which the location server 710 works through a base station 720 to coordinate the positioning of the target UE 705. Operations in method 700B may correspond with similarly-numbered operations in method 700A and may therefore be implemented as previously described.

Similar to the method 700A, the method 700B may begin with optional operation 725, in which the base station 720 provides the location server 710 with an indication that the target UE 705 has or will be transitioning to an SL active state while in a Uu inactive or idle state. Again, as an alternative to operation 725, an equivalent message may be sent to the location server 710 by the target UE 705 (e.g., relayed by base station 720) via LPP messaging, as shown by optional operation 727.

Once the LMF is aware of the RRC connection state of the UE, it can then work with the base station 720 to coordinate ranging of the target UE 705 through the RSUs 715-1 and 715-2. Thus, at operation 770, the location server 710 can send a request to the base station 720 for positioning of the target UE. According to some embodiments, the request at operation 770 may include identifiers for the RSUs 715-1 and 715-2, indicating to the location server 710 which RSUs to use for positioning of the target UE 705. The location server 710 can make this determination, for example, based on known positions of the RSUs 715-1 and 715-2 and an approximate location of the target UE 705. In response to the request, the base station 720 can perform operation 775, in which the base station 720 sends a request to each of the RSUs 715-1 and 715-2 for positioning of the target UE 705. As previously noted, the positioning request may include an SL ID of the target UE 705. Similar to method 700A, this can prompt RSUs 715-1 and 715-2 to perform ranging and obtain ranging measurements at operations 740, and then report the ranging measurements back to the base station 720, as indicated at operations 750. The base station 720 then provides these measurements to the location server 710, as indicated at operation 780. With this information, and the known position of the RSUs 715-1 and 715-2, the location server 710 can then perform operation 760, in which the location server 710 calculates the location of the target UE 705. In addition or as an alternative to operations 780 and 760 as shown in FIG. 7B, in some embodiments the base station 720 may calculate the position of the target UE and provide the calculated position to the location server 710.

Although the embodiments in FIGS. 7A and 7B illustrate UE-assisted positioning in which the network (e.g., base station 720 or location server 710) determines the position of the target UE 705, embodiments are not so limited. In alternative embodiments, a target UE 705 may request its position (e.g., via an SL connection with RSU 715-1 or RSU 715-2. Insert embodiments, the calculated position of the target UE may be provided to the target UE 705 by the base station 720 or location server 710. Again, this be provided via an SL connection. Alternatively, the RSUs 715-1 and 715-2 may provide ranging reports (e.g., similar to operation 750) directly to the target UE 705, in which case the target UE 705 may determine its own location. In such instances, the RSUs 715-1 and 715-2 may provide their locations to the target UE 705 to be able to make this determination.

Figure 8:
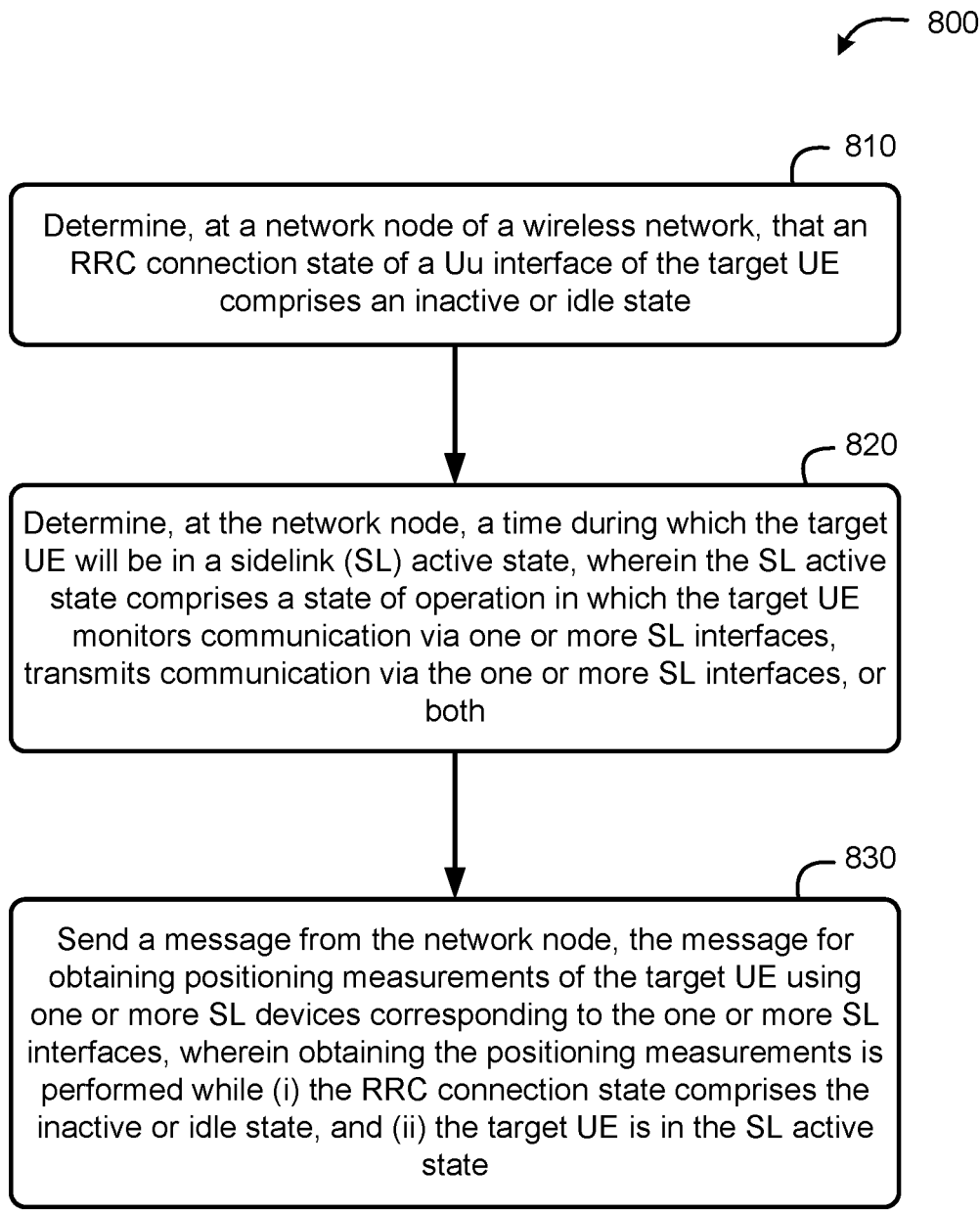
FIG. 8 is a flow diagram of a method for performing positioning of a target UE, according to an embodiment.
Figure 11:
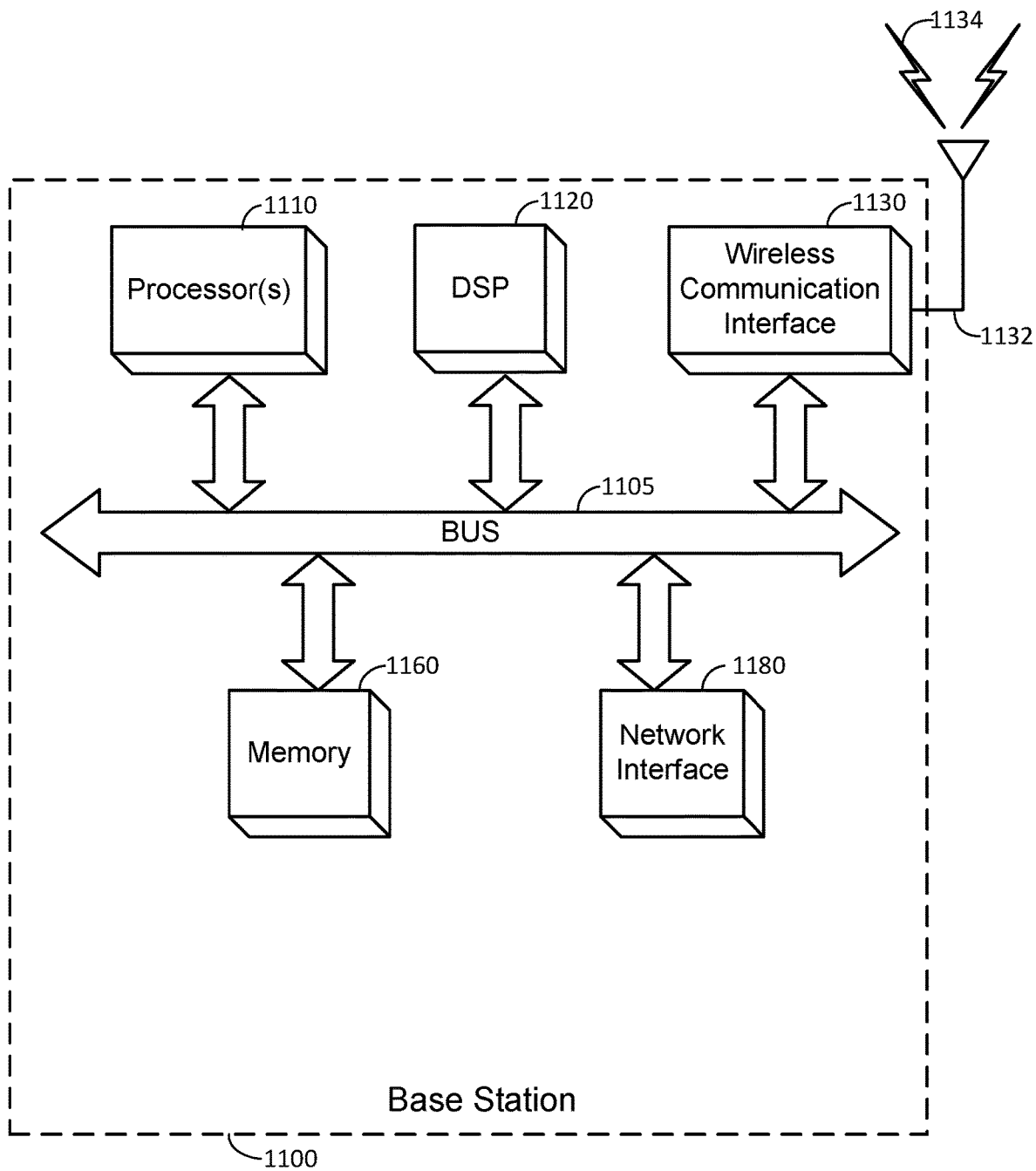
FIG. 11 is a block diagram of an embodiment of a base station.
Figure 12:
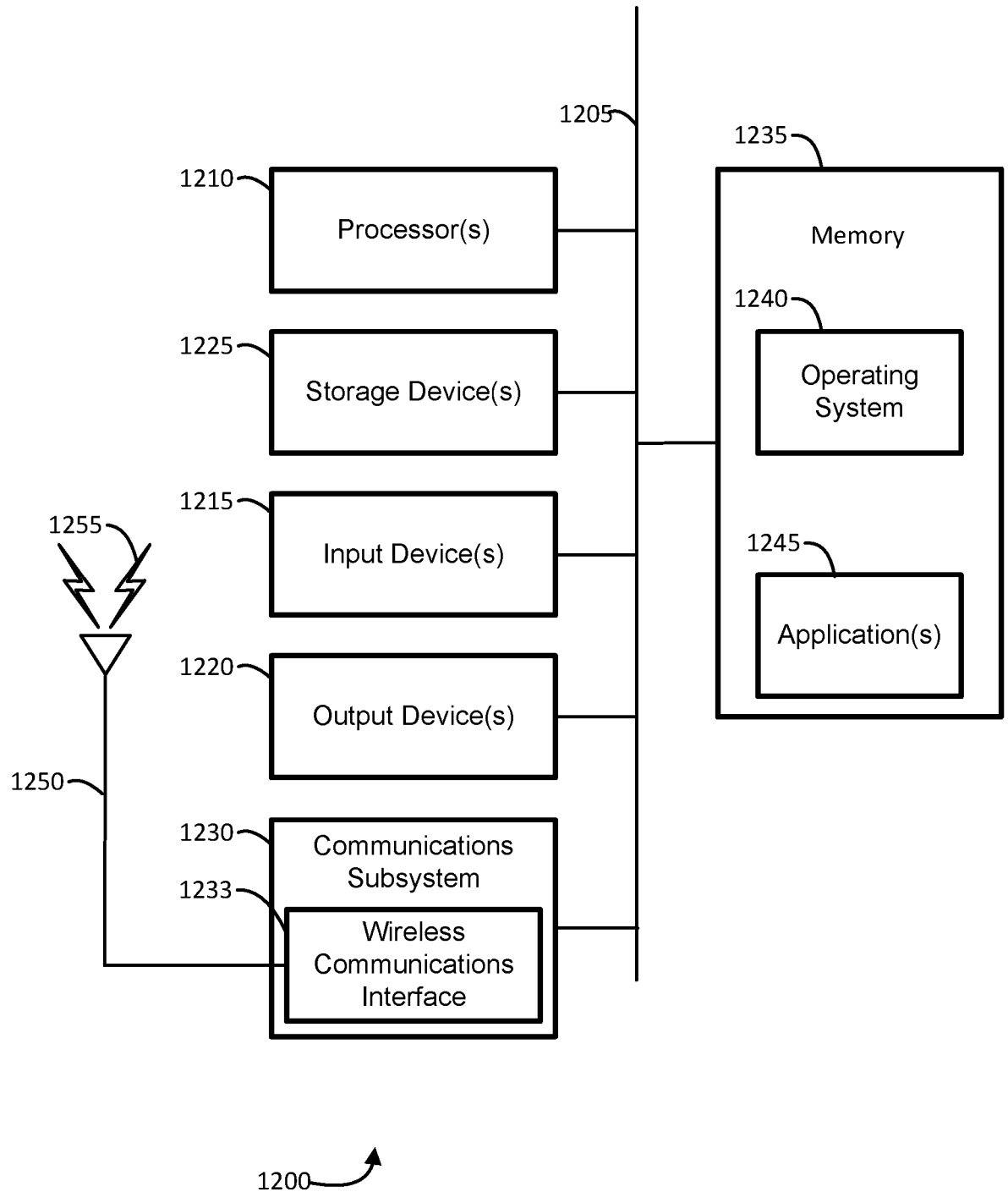
FIG. 12 is a block diagram of an embodiment of a computer system.

FIG. 8 is a flow diagram of a method 800 of performing SL positioning, according to an embodiment. Aspects of the method 800 may reflect functionality of a base station or location server as described with respect to the embodiments provided herein, for example. Means for performing the functionality illustrated in one or more of the blocks shown in FIG. 8 may be performed by hardware and/or software components of a base station or location server. Example components of a base station are illustrated in FIG. 11, and example components of a computer system that can function as a computer server are illustrated in FIG. 12. Descriptions of FIGS. 11 and 12 are provided in detail hereafter.

At block 810, the functionality comprises determining, at a network node of a wireless network, an RRC connection state of a Uu interface of the target UE comprises an inactive or idle state. As noted, inactive and idle states may correspond with RRC_INACTIVE and RRC_IDLE as using relevant 3GPP standards. As described hereafter, this information may be determined by a base station (e.g., gNB) and provided to a location server, either of which may comprise the network node.

Means for performing functionality at block 810 may comprise a bus 1105, processor(s) 1110, digital signal processor (DSP) 1120, wireless communication interface 1130, memory 1160, and/or other components of a base station 1100, as illustrated in FIG. 11. Means for performing functionality at block 810 also may comprise a bus 1205, processor(s) 1210, communications subsystem 1230, memory 1235 (including operating system 1240 and/or application(s) 1245), and/or other components of a computer system 1200, as illustrated in FIG. 12.

At block 820, the functionality comprises determining, at the network node, a time during which the target UE will be in a sidelink (SL) active state, wherein the SL active state comprises a state of operation in which the target UE monitors communication via one or more SL interfaces, transmits communication via the one or more SL interfaces, or both. The time may be determined by the target UE, defined in a relevant standard, or the like. As further noted herein, according to some embodiments, the time and may be relayed as a combination of start time, duration, and/or end time. Means for performing functionality at block 820 may comprise a bus 1105, processor(s) 1110, DSP 1120, wireless communication interface 1130, memory 1160, and/ or other components of abase station 1100, as illustrated in FIG. 11. Means for performing functionality at block 820 also may comprise a bus 1205, processor(s) 1210, communications subsystem 1230, memory 1235 (including operating system 1240 and/or application(s) 1245), and/or other components of a computer system 1200, as illustrated in FIG. 12.

At block 830, the functionality comprises sending a message from the network node, the message for obtaining positioning measurements of the target UE using one or more SL devices corresponding to the one or more SL interfaces, wherein obtaining the positioning measurements is performed while (i) the RRC connection state comprises the inactive or idle state, and (ii) the target UE is in the SL active state. As described herein, embodiments may perform additional operations, such as, subsequent to sending the message from the network node receiving the positioning measurements; and determining a position of the target UE based on the positioning measurements and a respective position of each of the one or more SL devices. Means for performing functionality at block 830 may comprise a bus 1105, processor(s) 1110, DSP 1120, wireless communication interface 1130, memory 1160, and/or other components of a base station 1100, as illustrated in FIG. 11. Means for performing functionality at block 830 also may comprise a bus 1205, processor(s) 1210, communications subsystem 1230, memory 1235 (including operating system 1240 and/or application(s) 1245), and/or other components of a computer system 1200, as illustrated in FIG. 12.

As detailed herein, embodiments in which the network node comprises a location server may employ any number of a variety of additional features, depending on desired functionality. According to some embodiments, the network node comprises a location server of the wireless network. In such embodiments, determining the RRC connection state may comprise receiving a message from a base station indicative of the RRC connection state. Additionally or alternatively, determining the time during which the target UE will be in an SL active state comprises receiving a message indicative of the time from a base station or the target UE. According to some embodiments, sending the message from the network node may comprise sending the message from the location server to a base station and/or from the location server to the one or more SL devices.

As detailed herein, embodiments in which the network node comprises a base station of the wireless network may employ any number of a variety of additional features, depending on desired functionality. For example, according to some embodiments, determining the RRC connection state may be based on an RRC release sent to the target UE from the base station. Additionally or alternatively, determining the time during which the target UE will be in an SL active state may comprise receiving a message indicative of the time from the target UE. According to some embodiments, sending the message from the network node may comprise sending the message from the base station to the one or more SL devices.

Figure 9:
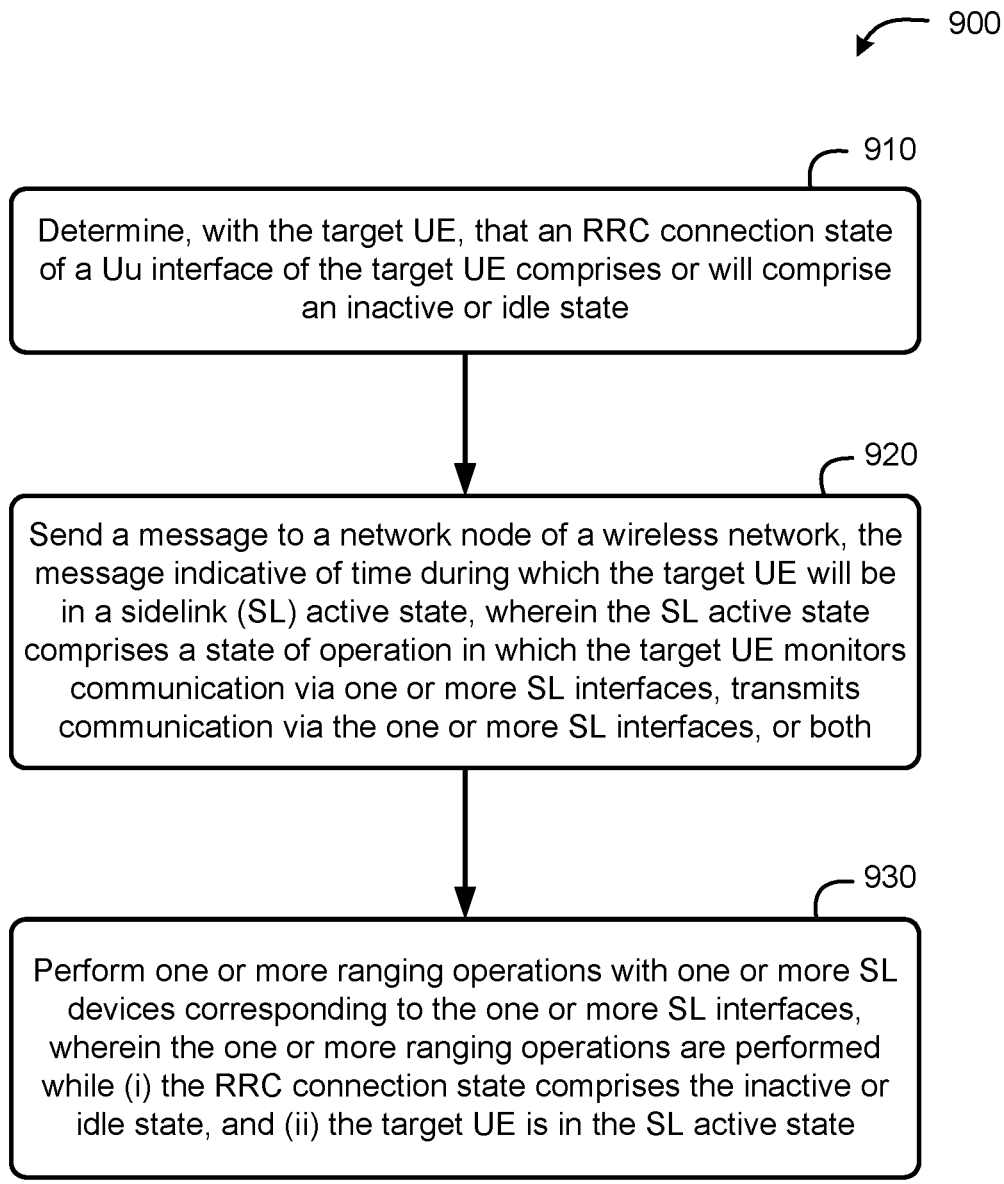
FIG. 9 is a flow diagram of another method for performing positioning of a target UE, according to an embodiment.
Figure 10:
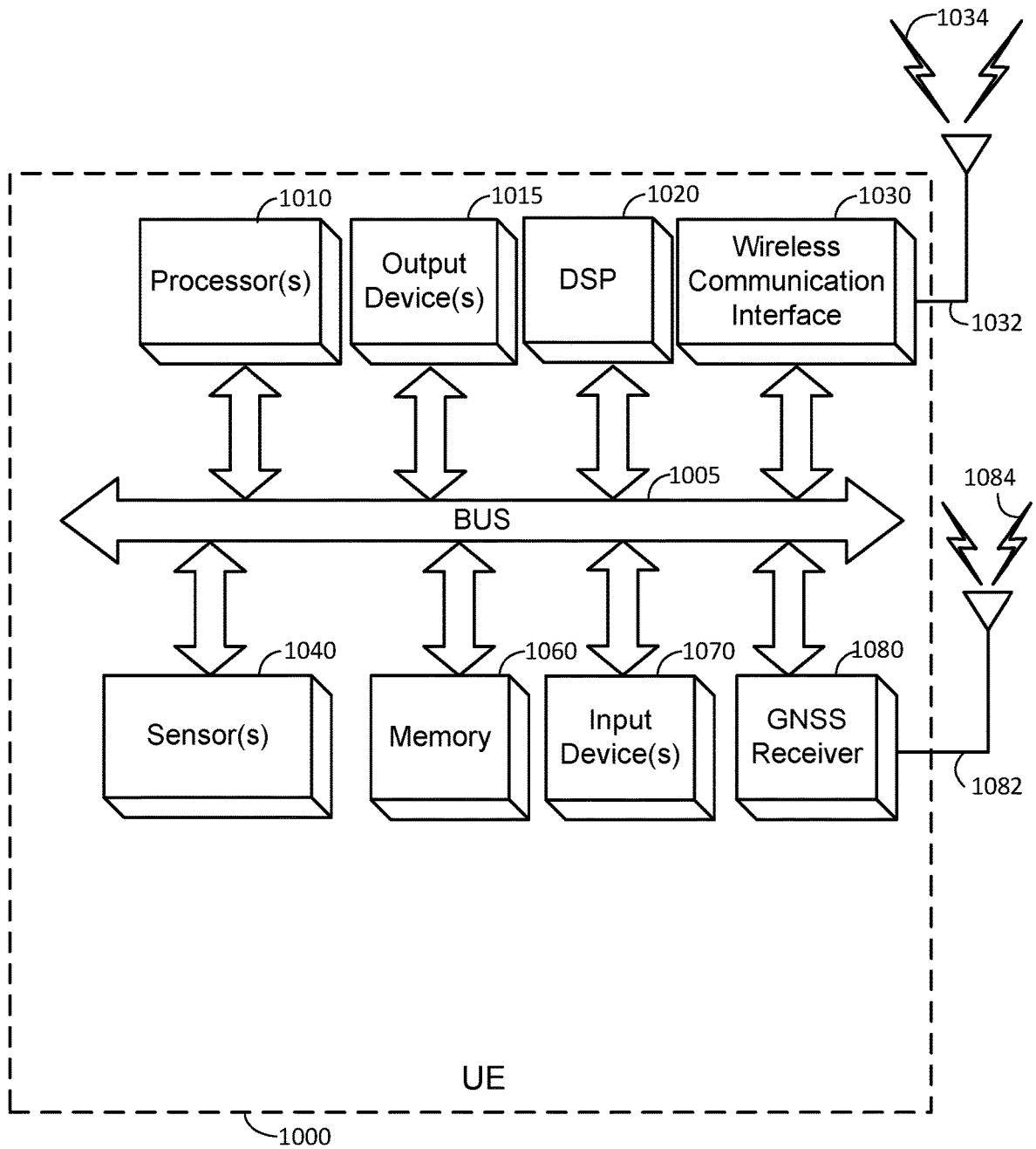
FIG. 10 is a block diagram of an embodiment of a UE.

FIG. 9 is a flow diagram of a method 900 of performing SL positioning, according to an embodiment. Aspects of the method 900 may reflect functionality of a target UE as described herein, for example. Means for performing the functionality illustrated in one or more of the blocks shown in FIG. 9 may be performed by hardware and/or software components of a UE. Example components of a UE are illustrated in FIG. 10, which is described in more detail hereafter.

At block 910, the functionality comprises determining, with the target UE, an RRC connection state of a Uu interface of the target UE comprises or will comprise an inactive or idle state. As noted herein, this may be in response to information received by a base station. For example, according to some embodiments, determining the RRC connection state comprises receiving an RRC release from a base station. Means for performing functionality at block 910 may comprise a bus 1005, processor 1010, digital signal processor (DSP) 1020, wireless communication interface 1030, memory 1060, and/or other components of a UE 1000, as illustrated in FIG. 10.

At block 920, the functionality comprises sending a message to a network node of a wireless network, the message indicative of time during which the target UE will be in a SL active state, wherein the SL active state comprises a state of operation in which the target UE monitors communication via one or more SL interfaces, transmits communication via the one or more SL interfaces, or both. Again, the time during which the target UE will be in the SL active state may be determined by the mobile device and/or governed by an applicable wireless standard. As described herein, one or more factors may impact the duration of this time. Also, as previously noted, the network node may comprise a location server or a base station. Means for performing functionality at block 920 may comprise a bus 1005, processor 1010, digital signal processor (DSP) 1020, wireless communication interface 1030, memory 1060, and/or other components of a UE 1000, as illustrated in FIG. 10.

At block 930, the functionality comprises performing one or more ranging operations with one or more SL devices corresponding to the one or more SL interfaces, wherein the one or more ranging operations are performed while (i) the RRC connection state comprises the inactive or idle state, and (ii) the target UE is in the SL active state. Means for performing functionality at block 930 may comprise a bus 1005, processor 1010, digital signal processor (DSP) 1020, wireless communication interface 1030, memory 1060, and/or other components of a UE 1000, as illustrated in FIG. 10.

As described herein, embodiments may include one or more additional features, depending on desired functionality. For example, some embodiments may further comprise, subsequent to performing the one or more ranging operations, sending a second message to the network node, the second message indicative of a time at which the target UE will no longer be in the SL active state. Additionally or alternatively, embodiments may comprise, subsequent to performing the one or more ranging operations, determining a position of the target UE based on positioning measurements obtained from the one or more ranging operations and a respective position of each of the one or more SL devices. Some embodiments may further comprise receiving, via at least one of the one or more SL interfaces, the positioning measurements, the respective position of each of the one or more SL devices, or both.

FIG. 10 is a block diagram of an embodiment of a UE 1000, which can be utilized as described herein above (e.g., in association with the previously-described figures). The UE may therefore correspond with and/or be incorporated into mobile device 105 of FIG. 1, UE 205 of FIG. 2, and/or any other UE described herein, including target UEs and/or anchor UEs. It should be noted that FIG. 10 is meant only to provide a generalized illustration of various components, any or all of which may be utilized as appropriate. Furthermore, the functionality of the UE discussed herein may be executed by one or more of the hardware and/or software components illustrated in FIG. 10.

The UE 1000 is shown comprising hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple ICs. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The UE 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1000 to communicate with other devices as described in the embodiments above. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1000 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement a global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1000 can further include sensor(s) 1040. Sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 1000, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1010 or DSP 1020.

The UE 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 1000 (and/or processor(s) 1010 or DSP 1020 within UE 1000). In some embodiments, then, such code and/or instructions can be used to configure and/or adapt a general-purpose computer (or other device) to perform one or more operations in accordance with the described methods.

FIG. 11 is a block diagram of an embodiment of a base station 1100, which can be utilized as described herein above, with respect to base stations and/or Transmission Reception Point (TRPs). It should be noted that FIG. 11 is meant only to provide a generalized illustration of various components, any or all of which may be utilized as appropriate. In some embodiments, the base station 1100 may correspond to a gNB, an ng-eNB, and/or (more generally) a TRP. In some cases, a base station 1100 may comprise multiple TRPs—e.g. with each TRP associated with a different antenna or a different antenna array of the base station 1100 (e.g., 1132). As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP.

The functionality performed by a base station 1100 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. The functionality of these functional components may be performed by one or more of the hardware and/or software components illustrated in FIG. 11.

The base station 1100 is shown comprising hardware elements that can be electrically coupled via a bus 1105 (or may otherwise be in communication, as appropriate). The hardware elements may include a processor(s) 1110 which can include without limitation one or more general-purpose processors, one or more special-purpose processors (such as digital signal processor (DSP) chips, graphics acceleration processors, application-specific integrated circuits (ASICs), and/or the like), and/or other processing structure or means. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below), according to some embodiments. The base station 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 1100 to communicate as described herein. The wireless communication interface 1130 may permit data and signaling to be communicated (e.g., transmitted and received) to UEs, other base stations/TRPs (e.g., eNBs, gNBs, and ng-eNBs), and/or other network components, computer systems, and/or other electronic devices described herein. The communication can be carried out via one or more wireless communication antenna(s) 1132 that send and/or receive wireless signals 1134. According to some embodiments, one or more wireless communication antenna(s) 1132 may comprise one or more antenna arrays, which may be capable of beamforming.

The base station 1100 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

In many embodiments, the base station 1100 may further comprise a memory 1160. The memory 1160 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the base station 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the base station 1100 (and/or processor(s) 1110 or DSP 1120 within base station 1100). In some embodiments, then, such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of one or more components and/or devices as described in the embodiments herein, including a location server such as an LMF. This may include, for example, a computer server, personal computer, personal electronic device, or the like. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processor(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers that may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other transmission reception points (TRPs), and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for performing positioning of a target user equipment (UE), the method comprising: determining, at a network node of a wireless network, that a Radio Resource Control (RRC) connection state of a Uu interface of the target UE comprises an inactive or idle state; determining, at the network node, a time during which the target UE will be in a sidelink (SL) active state, wherein the SL active state comprises a state of operation in which the target UE monitors communication via one or more SL interfaces, transmits communication via the one or more SL interfaces, or both; and sending a message from the network node, the message for obtaining positioning measurements of the target UE using one or more SL devices corresponding to the one or more SL interfaces, wherein obtaining the positioning measurements is performed while (i) the RRC connection state comprises the inactive or idle state, and (ii) the target UE is in the SL active state.

Clause 2. The method of clause 1, wherein the network node comprises a location server of the wireless network.

Clause 3. The method of clause 2 wherein determining the RRC connection state comprises receiving a message from a base station indicative of the RRC connection state.

Clause 4. The method of any one of clauses 2-3 wherein determining the time during which the target UE will be in an SL active state comprises receiving a message indicative of the time from a base station or the target UE.

Clause 5. The method of any one of clauses 2-4 wherein sending the message from the network node comprises sending the message from the location server to a base station.

Clause 6. The method of any one of clauses 2-4 wherein sending the message from the network node comprises sending the message from the location server to the one or more SL devices.

Clause 7. The method of clause 1 wherein the network node comprises a base station of the wireless network.

Clause 8. The method of clause 7 wherein determining the RRC connection state is based on an RRC release sent to the target UE from the base station.

Clause 9. The method of any one of clauses 7-8 wherein determining the time during which the target UE will be in an SL active state comprises receiving a message indicative of the time from the target UE.

Clause 10. The method of any one of clauses 7-9 wherein sending the message from the network node comprises sending the message from the base station to the one or more SL devices.

Clause 11. The method of any one of clauses 1-10 further comprising, subsequent to sending the message from the network node receiving the positioning measurements; and determining a position of the target UE based on the positioning measurements and a respective position of each of the one or more SL devices.

Clause 12. A method for performing positioning of a target user equipment (UE), the method comprising: determining, with the target UE, that a Radio Resource Control (RRC) connection state of a Uu interface of the target UE comprises or will comprise an inactive or idle state; sending a message to a network node of a wireless network, the message indicative of time during which the target UE will be in a sidelink (SL) active state, wherein the SL active state comprises a state of operation in which the target UE monitors communication via one or more SL interfaces, transmits communication via the one or more SL interfaces, or both; and performing one or more ranging operations with one or more SL devices corresponding to the one or more SL interfaces, wherein the one or more ranging operations are performed while (i) the RRC connection state comprises the inactive or idle state, and (ii) the target UE is in the SL active state.

Clause 13. The method of clause 12, wherein the network node comprises a location server or a base station.

Clause 14. The method of clause 13 wherein determining the RRC connection state comprises receiving an RRC release from a base station.

Clause 15. The method of any one of clauses 12-14 further comprising, subsequent to performing the one or more ranging operations, sending a second message to the network node, the second message indicative of a time at which the target UE will no longer be in the SL active state.

Clause 16. The method of any one of clauses 12-15 further comprising, subsequent to performing the one or more ranging operations, determining a position of the target UE based on positioning measurements obtained from the one or more ranging operations and a respective position of each of the one or more SL devices.

Clause 17. The method of any one of clauses 12-16 further comprising receiving, via at least one of the one or more SL interfaces, the positioning measurements, the respective position of each of the one or more SL devices, or both.

Clause 18. A network node for performing positioning of a target user equipment (UE), the network node comprising: a transceiver; a memory; and one or more processors communicatively coupled with the transceiver and the memory, wherein the one or more processors are configured to: determine that a Radio Resource Control (RRC) connection state of a Uu interface of the target UE comprises an inactive or idle state; determine a time during which the target UE will be in a sidelink (SL) active state, wherein the SL active state comprises a state of operation in which the target UE monitors communication via one or more SL interfaces, transmits communication via the one or more SL interfaces, or both; and send a message via the transceiver, the message for obtaining positioning measurements of the target UE using one or more SL devices corresponding to the one or more SL interfaces, wherein obtaining the positioning measurements is performed while (i) the RRC connection state comprises the inactive or idle state, and (ii) the target UE is in the SL active state.

Clause 19. The network node of clause 18, wherein the network node comprises a location server of the wireless network.

Clause 20. The network node of clause 19 wherein, to determine the RRC connection state, the one or more processors are configured to receive a message, via the transceiver, from a base station indicative of the RRC connection state.

Clause 21. The network node of any one of clauses 19-20 wherein, to determine the time during which the target UE will be in an SL active state, the one or more processors are configured to receive a message, via the transceiver, indicative of the time from a base station or the target UE.

Clause 22. The network node of any one of clauses 19-21 wherein, to send the message, the one or more processors are configured to send the message to a base station.

Clause 23. The network node of any one of clauses 19-21 wherein, to send the message, the one or more processors are configured to send the message to the one or more SL devices.

Clause 24. The network node of clause 23 wherein the network node comprises a base station of the wireless network.

Clause 25. The network node of clause 24 wherein the one or more processors are configured to determine the RRC connection state based on an RRC release sent to the target UE from the base station.

Clause 26. The network node of any one of clauses 24-25 wherein, to determine the time during which the target UE will be in an SL active state, the one or more processors are configured to receive a message indicative of the time from the target UE.

Clause 27. The network node of any one of clauses 24-26 wherein, to send the message, the one or more processors are configured to send the message to the one or more SL devices.

Clause 28. The network node of any one of clauses 18-27 wherein the one or more processors are further configured to, subsequent to sending the message from the network node: receive the positioning measurements; and determine a position of the target UE based on the positioning measurements and a respective position of each of the one or more SL devices.

Clause 29. A target UE for performing positioning of a target user equipment (UE), the target UE comprising: a transceiver; a memory; and one or more processors communicatively coupled with the transceiver and the memory, wherein the one or more processors are configured to: determine that a Radio Resource Control (RRC) connection state of a Uu interface of the target UE comprises or will comprise an inactive or idle state; send a message via the transceiver to a network node of a wireless network, the message indicative of time during which the target UE will be in a sidelink (SL) active state, wherein the SL active state comprises a state of operation in which the target UE monitors communication via one or more SL interfaces, transmits communication via the one or more SL interfaces, or both; and perform one or more ranging operations with one or more SL devices corresponding to the one or more SL interfaces, wherein the one or more ranging operations are performed while (i) the RRC connection state comprises the inactive or idle state, and (ii) the target UE is in the SL active state.

Clause 30. The target UE of clause 29, wherein, to determine the RRC connection state, the one or more processors are configured to receive, via the transceiver, an RRC release from a base station.

Clause 31. The target UE of any one of clauses 29-30 wherein the one or more processors are further configured to, subsequent to performing the one or more ranging operations, send a second message to the network node, the second message indicative of a time at which the target UE will no longer be in the SL active state.

Clause 32. The target UE of any one of clauses 29-31 wherein the one or more processors are further configured to, subsequent to performing the one or more ranging operations, determine a position of the target UE based on positioning measurements obtained from the one or more ranging operations and a respective position of each of the one or more SL devices.

Clause 33. The target UE of clause 32 wherein the one or more processors are further configured to receive, via at least one of the one or more SL interfaces, the positioning measurements, the respective position of each of the one or more SL devices, or both.

Clause 34. An apparatus having means for performing the method of any one of clauses 1-33.

Clause 35. A non-transitory computer-readable medium storing instructions, the instructions comprising code for performing the method of any one of clauses 1-33.

What is claimed is:

1. A method for performing positioning of a target user equipment (UE), the method comprising:
   determining, at a network node of a wireless network, that a Radio Resource Control (RRC) connection state of a Uu interface of the target UE comprises an inactive or idle state;
   determining, at the network node, a time during which the target UE will be in a sidelink (SL) active state, wherein the SL active state comprises a state of operation in which the target UE monitors communication via one or more SL interfaces, transmits communication via the one or more SL interfaces, or both; and
   sending a message from the network node, the message for obtaining positioning measurements of the target UE using one or more SL devices corresponding to the one or more SL interfaces, wherein obtaining the positioning measurements is performed while (i) the RRC connection state comprises the inactive or idle state, and (ii) the target UE is in the SL active state.

2. The method of claim 1, wherein the network node comprises a location server of the wireless network.

3. The method of claim 2, wherein determining the RRC connection state comprises receiving a message from a base station indicative of the RRC connection state.

4. The method of claim 2, wherein determining the time during which the target UE will be in an SL active state comprises receiving a message indicative of the time from a base station or the target UE.

5. The method of claim 2, wherein sending the message from the network node comprises sending the message from the location server to a base station or the one or more SL devices.

6. The method of claim 1, wherein the network node comprises a base station of the wireless network.

7. The method of claim 6, wherein determining the RRC connection state is based on an RRC release sent to the target UE from the base station.

8. The method of claim 6, wherein determining the time during which the target UE will be in an SL active state comprises receiving a message indicative of the time from the target UE.

9. The method of claim 6, wherein sending the message from the network node comprises sending the message from the base station to the one or more SL devices.

10. The method of claim 1, further comprising, subsequent to sending the message from the network node:
receiving the positioning measurements; and
determining a position of the target UE based on the positioning measurements and a respective position of each of the one or more SL devices.

11. A network node of a wireless network, the network node comprising:
a transceiver;
a memory; and
one or more processors communicatively coupled with the transceiver and the memory, wherein the one or more processors are configured to:
determine that a Radio Resource Control (RRC) connection state of a Uu interface of a target user equipment (UE) comprises an inactive or idle state;
determine a time during which the target UE will be in a sidelink (SL) active state, wherein the SL active state comprises a state of operation in which the target UE monitors communication via one or more SL interfaces, transmits communication via the one or more SL interfaces, or both; and
send a message via the transceiver, the message for obtaining positioning measurements of the target UE using one or more SL devices corresponding to the one or more SL interfaces, wherein obtaining the positioning measurements is performed while (i) the RRC connection state comprises the inactive or idle state, and (ii) the target UE is in the SL active state.

12. The network node of claim 11, wherein the network node comprises a location server of the wireless network.

13. The network node of claim 12, wherein, to determine the RRC connection state, the one or more processors are configured to receive a message, via the transceiver, from a base station indicative of the RRC connection state.

14. The network node of claim 12, wherein, to determine the time during which the target UE will be in an SL active state, the one or more processors are configured to receive a message, via the transceiver, indicative of the time from a base station or the target UE.

15. The network node of claim 12, wherein, to send the message, the one or more processors are configured to send the message to a base station or the one or more SL devices.

16. The network node of claim 11, wherein the network node comprises a base station of the wireless network.

17. The network node of claim 16, wherein the one or more processors are configured to determine the RRC connection state based on an RRC release sent to the target UE from the base station.

18. The network node of claim 16, wherein, to determine the time during which the target UE will be in an SL active state, the one or more processors are configured to receive a message indicative of the time from the target UE.

19. The network node of claim 11, wherein the one or more processors are further configured to, subsequent to sending the message from the network node:
receive the positioning measurements; and
determine a position of the target UE based on the positioning measurements and a respective position of each of the one or more SL devices.

* * * * *